US012659210B2

(12) United States Patent
Liu et al.

(10) Patent No.: US 12,659,210 B2
(45) Date of Patent: Jun. 16, 2026

(54) REFERENCE SIGNALS FOR PHASE JUMP BOUNDARIES

(71) Applicant: QUALCOMM Incorporated, San Diego, CA (US)

(72) Inventors: Chih-Hao Liu, San Diego, CA (US); Jing Sun, San Diego, CA (US); Morteza Soltani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 18/896,645

(22) Filed: Sep. 25, 2024

(65) Prior Publication Data

US 2026/0089044 A1 Mar. 26, 2026

(51) Int. Cl.
*H04L 27/26* (2006.01)
*H04W 72/0446* (2023.01)
*H04W 72/0453* (2023.01)

(52) U.S. Cl.
CPC ...... *H04L 27/265* (2013.01); *H04L 27/26526* (2021.01); *H04W 72/0446* (2013.01); *H04W 72/0453* (2013.01)

(58) Field of Classification Search
CPC . H04B 17/346; H04B 17/328; H04L 27/2647; H04L 5/0007; H04L 5/0051; H04L 27/2605; H04W 24/10; H04W 24/08
USPC ................................ 375/260, 262, 267, 399
See application file for complete search history.

(56) References Cited

U.S. PATENT DOCUMENTS

| | | | |
|---|---|---|---|
| 12,445,336 B1 | 10/2025 | Liu et al. | |
| 2022/0182208 A1* | 6/2022 | Yu | H04L 5/0053 |
| 2022/0360396 A1* | 11/2022 | Sridharan | H04L 5/14 |
| 2023/0044215 A1* | 2/2023 | Wang | H04W 72/20 |

(Continued)

OTHER PUBLICATIONS

Interdigital Inc: "Joint Channel Estimation for PUSCH", 3GPP Draft; 3GPP TSG RAN WG1 #106-e, R1-2107652, 3rd Generation Partnership Project, Mobile Competence Centre, 650, Route Des Lucioles, F-06921, Sophia-Antipolis Cedex, France, vol. RAN WG1, No. e-Meeting; Aug. 16, 2021-Aug. 27, 2021, Aug. 7, 2021, 12 Pages, XP052038545, section 2.5.

(Continued)

*Primary Examiner* — Khai Tran
(74) *Attorney, Agent, or Firm* — Holland & Hart LLP/Qualcomm Incorporated

(57) ABSTRACT

In accordance with some of the techniques described herein, various approaches are provided for inserting a time domain reference signal into a shared channel across the phase jump boundary. For example, a first reference signal may be multiplexed with a shared channel in the time domain before a discrete Fourier transform (DFT) is performed. The reference signal may be transmitted in a symbol before a phase jump. A second reference signal may be multiplexed with a shared channel in the time domain before a DFT is performed. The reference signal may be transmitted in a symbol after the phase jump. Multiplexing the reference signal in the time domain may partly or completely avoid the use of different DFT sizes or channel equalization for phase jump estimation. Accordingly, implementation complexity or processing complexity may be reduced by multiplexing the reference signal with shared channel data before the DFT.

30 Claims, 13 Drawing Sheets

(56) References Cited

U.S. PATENT DOCUMENTS

| | | | | |
|---|---|---|---|---|
| 2023/0179351 A1* | 6/2023 | Kumar | ................. | H04L 5/0023 |
| | | | | 370/330 |
| 2024/0048319 A1* | 2/2024 | Yang | .................... | H04W 72/21 |
| 2025/0267493 A1* | 8/2025 | Duan | ................... | H04B 17/318 |

OTHER PUBLICATIONS

International Search Report and Written Opinion—PCT/US2025/
042425—ISA/EPO—Dec. 18, 2025.
Mitsubishi Electric: "Summary of Analysis of UW-DFT-s-OFDM",
3GPP Draft; 3GPP TSG RAN WG1 Meeting #88, R1-1702755-
UWDFTSOFDM_MITBS, 3rd Generation Partnership Project, Mobile
Competence Centre, 650, Route Des Lucioles, F-06921, Sophia-
Antipolis Cedex, France, vol. RAN WG1, No. Athens, Greece; Feb.
13, 2017-Feb. 17, 2017, Feb. 7, 2017, 6 Pages, XP051221595, p. 2,
last paragraph; figure 1.

\* cited by examiner 205-a 205-b

705 ⌐ Format first symbol and second symbol

710 ⌐ First Symbol with First Reference Signal

715 ⌐ Decode first shared channel data

720 ⌐ Phase Jump

725 ⌐ Second Symbol with Second Reference Signal

730 ⌐ Estimate phase based on the first reference signal and the second reference signal 735 ⌐ Decode second shared channel data based on the estimated phase

700

1025

1030

1035

1020

1000

Figure 12:
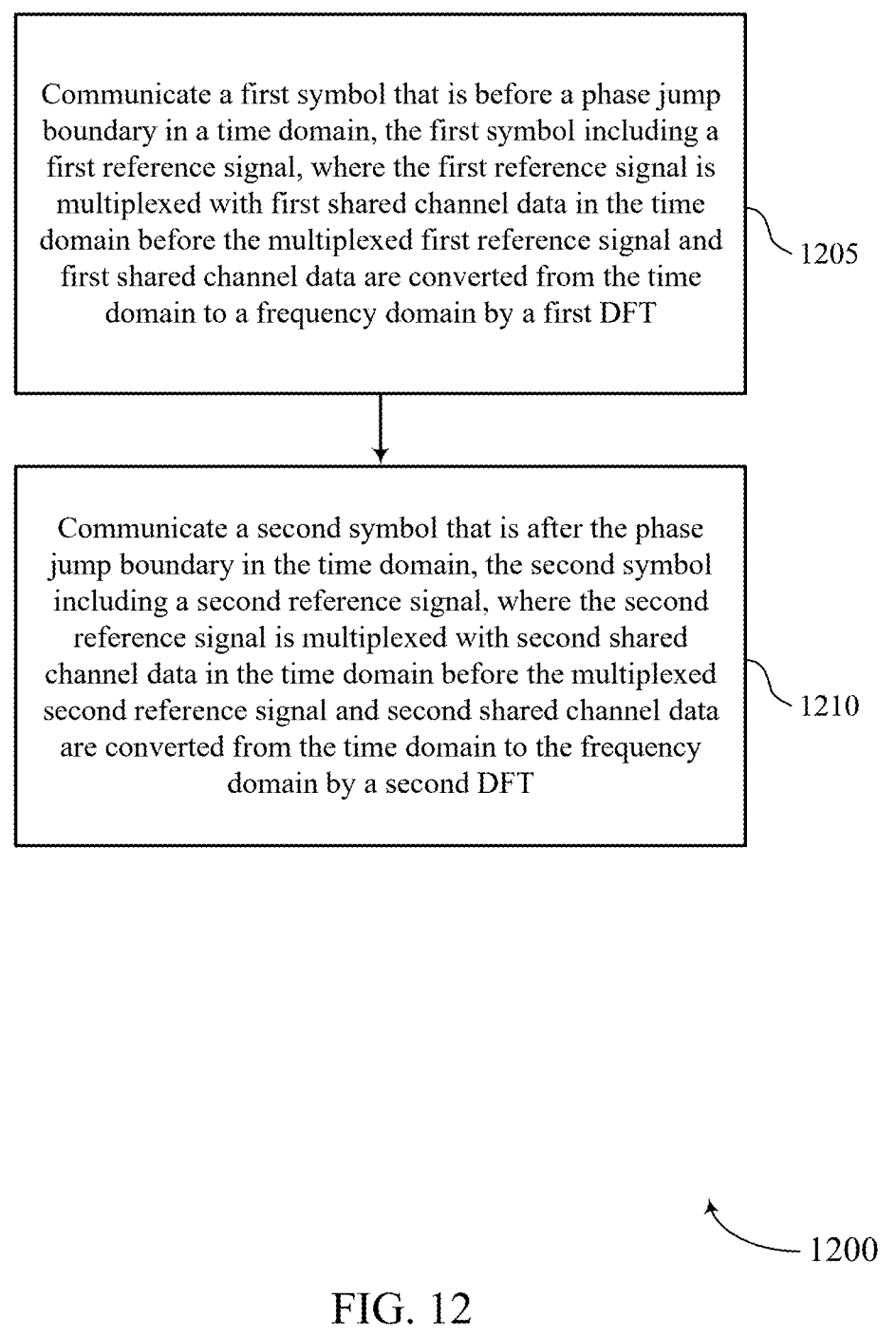

Communicate a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT

1205

Communicate a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT

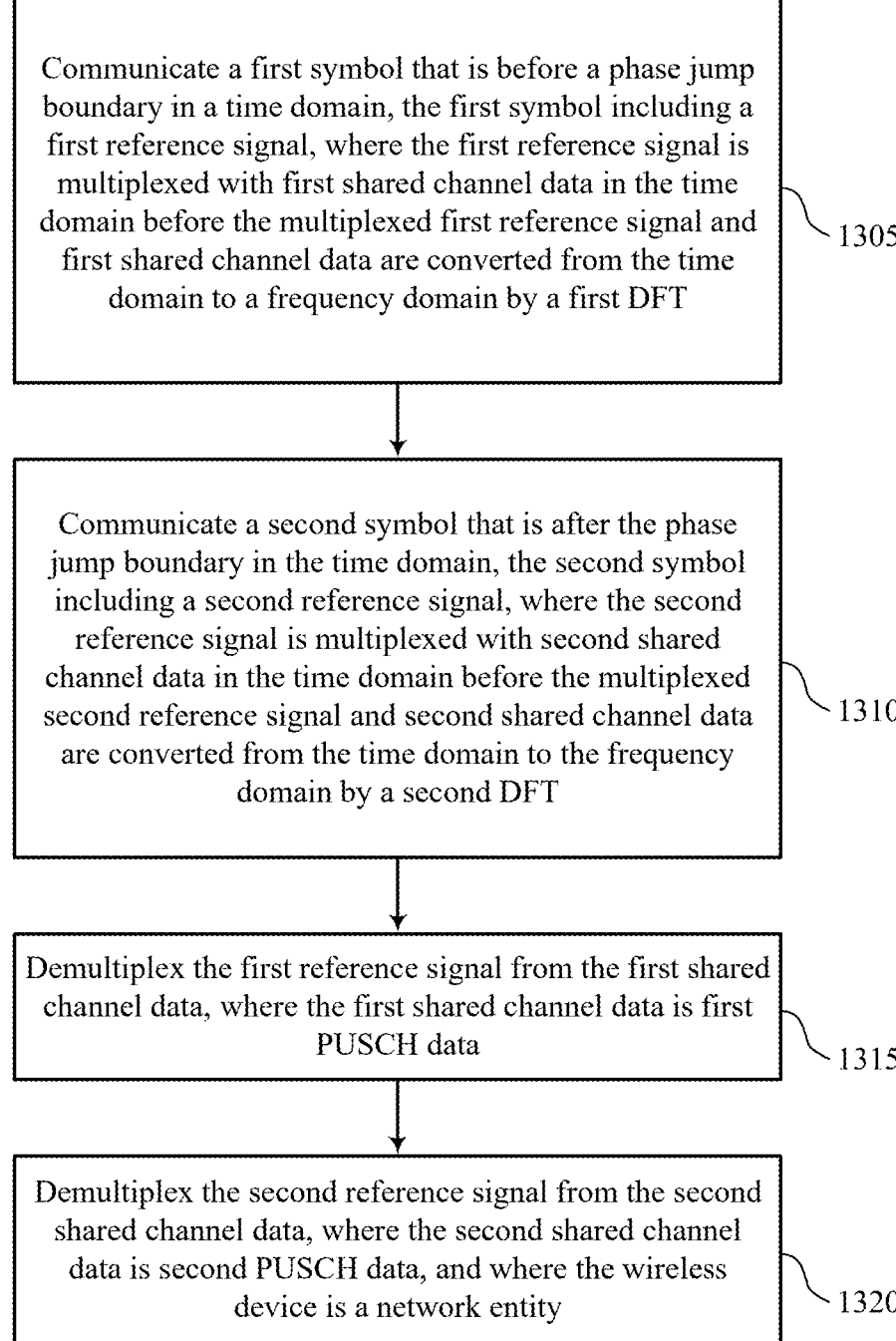

Communicate a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT

1305

Communicate a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT

1310

Demultiplex the first reference signal from the first shared channel data, where the first shared channel data is first PUSCH data

1315

Demultiplex the second reference signal from the second shared channel data, where the second shared channel data is second PUSCH data, and where the wireless device is a network entity

REFERENCE SIGNALS FOR PHASE JUMP BOUNDARIES

FIELD OF TECHNOLOGY

The following relates to wireless communications, including reference signals for phase jump boundaries.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method by a wireless device is described. The method may include communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first discrete Fourier transform (DFT) and communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

A wireless device is described. The wireless device may include one or more memories storing processor executable code, a transceiver, and one or more processors coupled with the one or more memories and the transceiver. The one or more processors may individually or collectively be operable to execute the code to cause the wireless device to communicate, via the transceiver, a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT and communicate, via the transceiver, a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

Another wireless device is described. The wireless device may include means for communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT and means for communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

A non-transitory computer-readable medium storing code is described. The code may include instructions executable by one or more processors to communicate a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT and communicate a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

In some examples of the method, wireless devices, and non-transitory computer-readable medium described herein, the first shared channel data may be communicated before the phase jump boundary via first discrete Fourier transform-spread-orthogonal frequency division multiplexing (DFT-s-OFDM) symbols and the second shared channel data may be communicated after the phase jump boundary via second DFT-s-OFDM symbols.

In some examples of the method, wireless devices, and non-transitory computer-readable medium described herein, the first reference signal includes a first random sequence and the second reference signal includes a second random sequence.

In some examples of the method, wireless devices, and non-transitory computer-readable medium described herein, the second symbol may be before or after a symbol that carries a demodulation reference signal (DMRS) after the phase jump boundary.

In some examples of the method, wireless devices, and non-transitory computer-readable medium described herein, the first symbol includes a set of multiple first reference signals and each of the set of multiple first reference signals may be indicated via a respective one of a set of multiple first sets of one or more bits.

In some examples of the method, wireless devices, and non-transitory computer-readable medium described herein, a quantity of the set of multiple first reference signals or a quantity of the one or more bits in each of the set of multiple first sets may be based on a quantity of resource blocks allocated for the first shared channel data.

In some examples of the method, wireless devices, and non-transitory computer-readable medium described herein, the first reference signal may be positioned at an end of the first symbol in the time domain and the second reference signal may be positioned at a beginning of the second symbol in the time domain.

In some examples of the method, wireless devices, and non-transitory computer-readable medium described herein, the first symbol includes a set of multiple first reference signals with a first gap between at least two of the set of multiple first reference signals in the time domain, and the second symbol includes a set of multiple second reference signals with a second gap between at least two of the set of multiple second reference signals in the time domain.

In some examples of the method, wireless devices, and non-transitory computer-readable medium described herein, the first reference signal may be evenly distributed across a frequency domain resource allocation associated with the first symbol.

In some examples of the method, wireless devices, and non-transitory computer-readable medium described herein, a first orthogonal cover code (OCC) associated with a first device and a second OCC associated with a second device may be each applied for at least a portion of the first symbol.

In some examples of the method, wireless devices, and non-transitory computer-readable medium described herein, the first symbol includes a set of multiple sets of one or more bits, and each of a set of multiple offsets corresponds to a different offset applied to a respective set of the set of multiple sets of one or more bits.

In some examples of the method, wireless devices, and non-transitory computer-readable medium described herein, each of the set of multiple offsets may be associated with a different device, each of a set of multiple orthogonal cover codes (OCCs) may be respectively associated with each different device, and one or more of the set of multiple OCCs may be each applied to one or more of the set of multiple sets of one or more bits.

In some examples of the method, wireless devices, and non-transitory computer-readable medium described herein, at least a portion of the first shared channel data may be rate-matched to the first reference signal in the time domain and at least a portion of the second shared channel data may be rate-matched to the second reference signal in the time domain.

In some examples of the method, wireless devices, and non-transitory computer-readable medium described herein, a transport block size (TBS) of the first shared channel data may be based on the first reference signal being included in the first symbol.

In some examples of the method, wireless devices, and non-transitory computer-readable medium described herein, at least a portion of the first shared channel data may be punctured in the time domain based on the first reference signal being included in the first symbol and at least a portion of the second shared channel data may be punctured in the time domain based on the second reference signal being included in the second symbol.

In some examples of the method, wireless devices, and non-transitory computer-readable medium described herein, the first shared channel data may be first physical uplink shared channel (PUSCH) data and the second shared channel data may be second PUSCH data and the wireless device may be a user equipment (UE).

Some examples of the method, wireless devices, and non-transitory computer-readable medium described herein may further include operations, features, means, or instructions for demultiplexing the first reference signal from the first shared channel data, where the first shared channel data may be first physical downlink shared channel (PDSCH) data and demultiplexing the second reference signal from the second shared channel data, where the second shared channel data may be second PDSCH data, and where the wireless device may be a UE.

In some examples of the method, wireless devices, and non-transitory computer-readable medium described herein, the first shared channel data may be first PDSCH data and the second shared channel data may be second PDSCH data and the wireless device may be a network entity.

Some examples of the method, wireless devices, and non-transitory computer-readable medium described herein may further include operations, features, means, or instructions for demultiplexing the first reference signal from the first shared channel data, where the first shared channel data may be first PUSCH data and demultiplexing the second reference signal from the second shared channel data, where the second shared channel data may be second PUSCH data, and where the wireless device may be a network entity.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 12 and 13 show flowcharts illustrating methods that support reference signals for phase jump boundaries in accordance with one or more aspects of the present disclosure.

DETAILED DESCRIPTION

Figure 1:
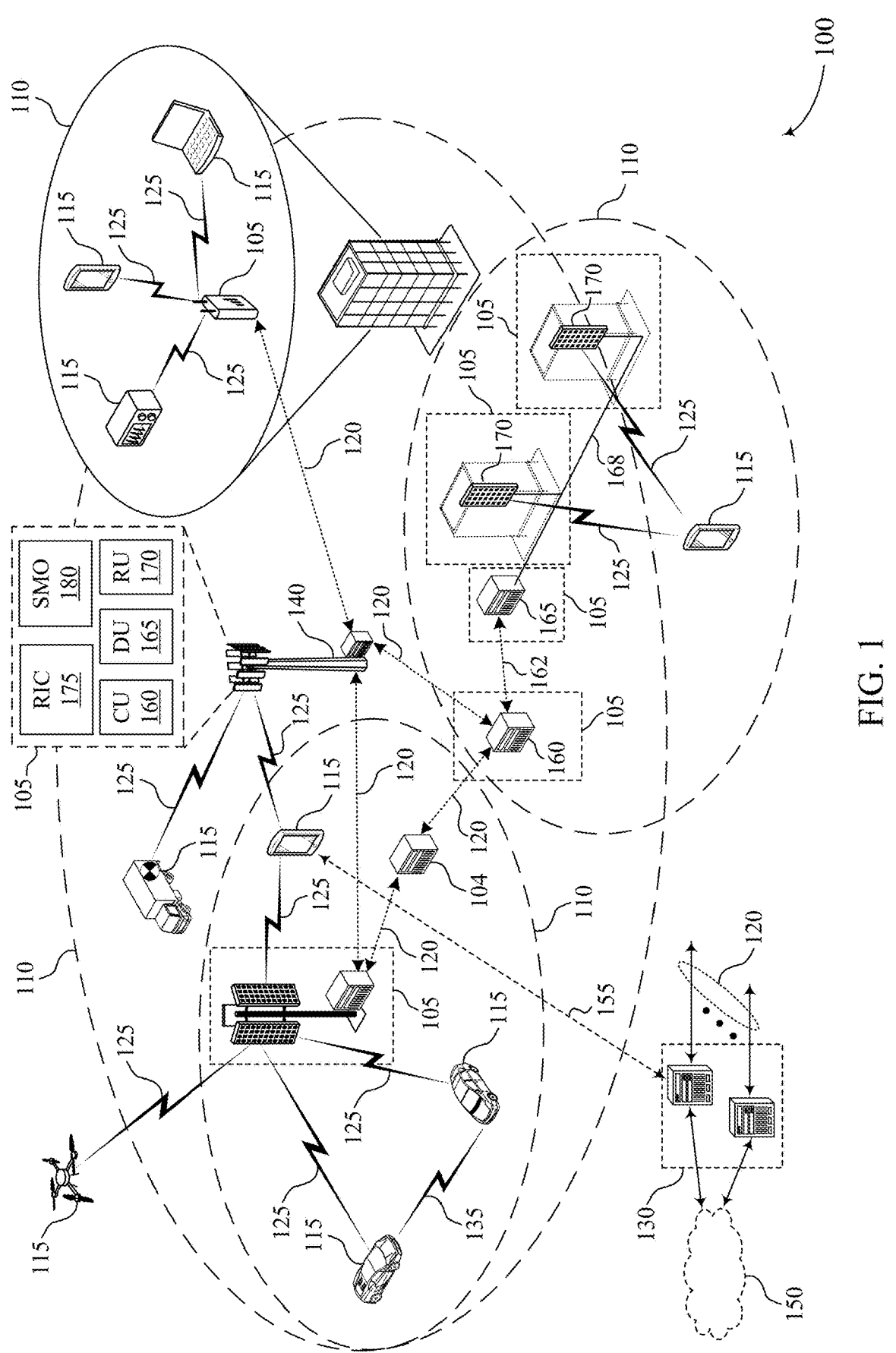
FIG. 1 shows an example of a wireless communications system that supports reference signals for phase jump boundaries in accordance with one or more aspects of the present disclosure.

In some wireless communications systems, a data transmission (e.g., via a physical uplink shared channel (PUSCH), physical downlink shared channel (PDSCH), or physical sidelink shared channel (PSSCH)) may be transmitted over one or more slots. A demodulation reference signal (DMRS) may be multiplexed with the data and used to aid a receiving device in decoding the data transmission. In some cases, however, DMRS ports associated with DMRS transmissions in each slot may lack coherence (e.g., phase coherence), and a difference in phase between slots of the data transmission may affect decoding efficiency (e.g., because independent phase changes, or phase "jumps," may need to be estimated per port). Phase continuity may pose a challenge for fluid start and length indicator value (SLIV) and DMRS sharing across multiple SLIVs.

In some approaches, a reference signal (e.g., a phase difference estimation reference signal, a phase change estimation reference signal, or a "glue" reference signal) may be included with the data transmission to assist the receiving device in determining the phase change between the slots. For example, reference signals may be utilized around a potential logical or physical gap in which a phase jump or gain state change may occur. A "phase jump" may refer to a phase change or phase difference. In some examples, a phase jump may be characterized by an amount (e.g., a threshold amount) of phase change (e.g., greater than 2°, 5°, 10°, 25°, 50°, 90°, 100°, 130°, or another amount of phase change). For instance, the phase jump may refer to a physical or logical gap (between signals, for instance), where phase continuity may be difficult to maintain. The reference signals may allow a receiver to estimate the phase jump and perform joint channel estimation.

In some approaches, a post-discrete Fourier transform (DFT) reference signal may be utilized, which may occupy resources (e.g., Zadoff-Chu sequence, computer generated sequence (CGS), or $\pi/2$ binary phase shift keying (BPSK)) in the frequency domain for a DFT spread orthogonal frequency domain multiplexing (DFT-s-OFDM) shared channel (e.g., PDSCH, PUSCH, or PSSCH, among other examples). A post-DFT reference signal may allow the receiver to directly estimate the phase jump from the frequency tones of two reference signals or one reference signal and one DMRS across the phase jump boundary (where channel estimation or channel equalization may not be utilized in some approaches). If two reference signals or one reference signal and one DMRS use different sequences, the receiver may perform frequency domain descrambling. However, for a post-DFT reference signal, when a DFT spread shared channel and reference signal are frequency domain multiplexed in the same reference signal symbol, a different size of DFT for transformed precoding may be utilized, which may add some implementation complexity.

In accordance with some of the techniques described herein, various approaches are provided for inserting a time domain reference signal into a DFT spread shared channel across the phase jump boundary. For example, a first reference signal may be multiplexed with a shared channel in the time domain before a DFT is performed. The first reference signal may be communicated (e.g., transmitted by a transmitting device, received by a receiving device) in a symbol before a phase jump. A second reference signal may be multiplexed with a shared channel in the time domain before a DFT is performed. The second reference signal may be communicated (e.g., transmitted by a transmitting device, received by a receiving device) in a symbol after the phase jump. As used herein, communicating (e.g., a symbol, a signal) may mean transmitting when the communicating is performed by a transmitting device and may mean receiving when the communicating is performed by a receiving device. Multiplexing the reference signal in the time domain may partly or completely avoid the use of different DFT sizes for the shared channel and reference signals, or may partly or completely avoid channel equalization to reduce inter-symbol interference for phase jump estimation. Accordingly, implementation complexity or processing complexity may be reduced by multiplexing the reference signal with shared channel data before the DFT.

Aspects of the disclosure are initially described in the context of wireless communications systems. Aspects of the disclosure are also described in the context of resource diagrams and a process flow. Aspects of the disclosure are further illustrated by and described with reference to apparatus diagrams, system diagrams, and flowcharts that relate to reference signals for phase jump boundaries.

FIG. 1 shows an example of a wireless communications system 100 that supports reference signals for phase jump boundaries in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link (s) 125 (e.g., one or more access links) using resources associated with one or more carriers. The term "carrier" may refer to a set of RF spectrum resources having a defined PHY layer structure for supporting the communication link (s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, a data transmission (e.g., via a PUSCH or PDSCH) may be transmitted over one or more slots. A DMRS may be multiplexed with the data and used to aid a receiving device in decoding the data transmission. In some cases, however, DMRS ports associated with DMRS transmissions in each slot may lack coherence (e.g., phase coherence), and a difference in phase between slots of the data transmission may affect decoding efficiency (e.g., because independent phase changes, or phase "jumps," may need to be estimated per port). Phase continuity may pose a challenge for fluid SLIV and DMRS sharing across multiple SLIVs. In some approaches, a reference signal (e.g., a phase difference estimation reference signal, a phase change estimation reference signal, or a "glue" reference signal) may be included with the data transmission to assist the receiving device in determining the phase change between the slots. For example, reference signals may be utilized around a potential logical or physical gap in which a phase jump or gain state change may occur. The reference signals may allow a receiver to estimate the phase jump and perform joint channel estimation.

In some approaches, a post-DFT reference signal may be utilized, which may occupy resources (e.g., Zadoff-Chu sequence, CGS, or π/2 BPSK) in the frequency domain for a DFT-s-OFDM shared channel (e.g., PDSCH or PUSCH). A post-DFT reference signal may allow the receiver to directly estimate the phase jump from the frequency tones of two reference signals or one reference signal and one DMRS across the phase jump boundary (where channel estimation or channel equalization may not be utilized in some approaches). If two reference signals or one reference signal and one DMRS use different sequences, the receiver may perform frequency domain descrambling. However, for a post-DFT reference signal, when a DFT spread shared channel and reference signal are frequency domain multiplexed in the same reference signal symbol, a different size of DFT for transformed precoding may be utilized, which may add some implementation complexity.

In some approaches, a reference signal may be utilized directly in the time domain. For frequency selective channels, these approaches may demand channel equalization to reduce inter symbol interference (ISI) before a receiver performs the phase jump estimation. The channel equalization may rely on one or more nearby DMRS symbols. In some cases, the direct time domain approach may be effective for low Doppler scenarios or for higher Doppler scenarios where a DMRS symbol is relatively close in time to the reference signal.

In accordance with some of the techniques described herein, various approaches are provided for inserting a time domain reference signal into a DFT spread shared channel across the phase jump boundary. For example, a device (e.g., a UE 115 or a network entity 105) may multiplex a first reference signal with a shared channel in the time domain before a DFT is performed. The device may transmit the reference signal in a symbol before a phase jump. The device may multiplex a second reference signal with a shared channel in the time domain before a DFT is performed. The device may transmit the reference signal in a symbol after the phase jump. Multiplexing the reference signal in the time domain may partly or completely avoid the use of different DFT sizes for the shared channel and reference signals, or may partly or completely avoid channel equalization to reduce ISI for phase jump estimation.

Figure 2:
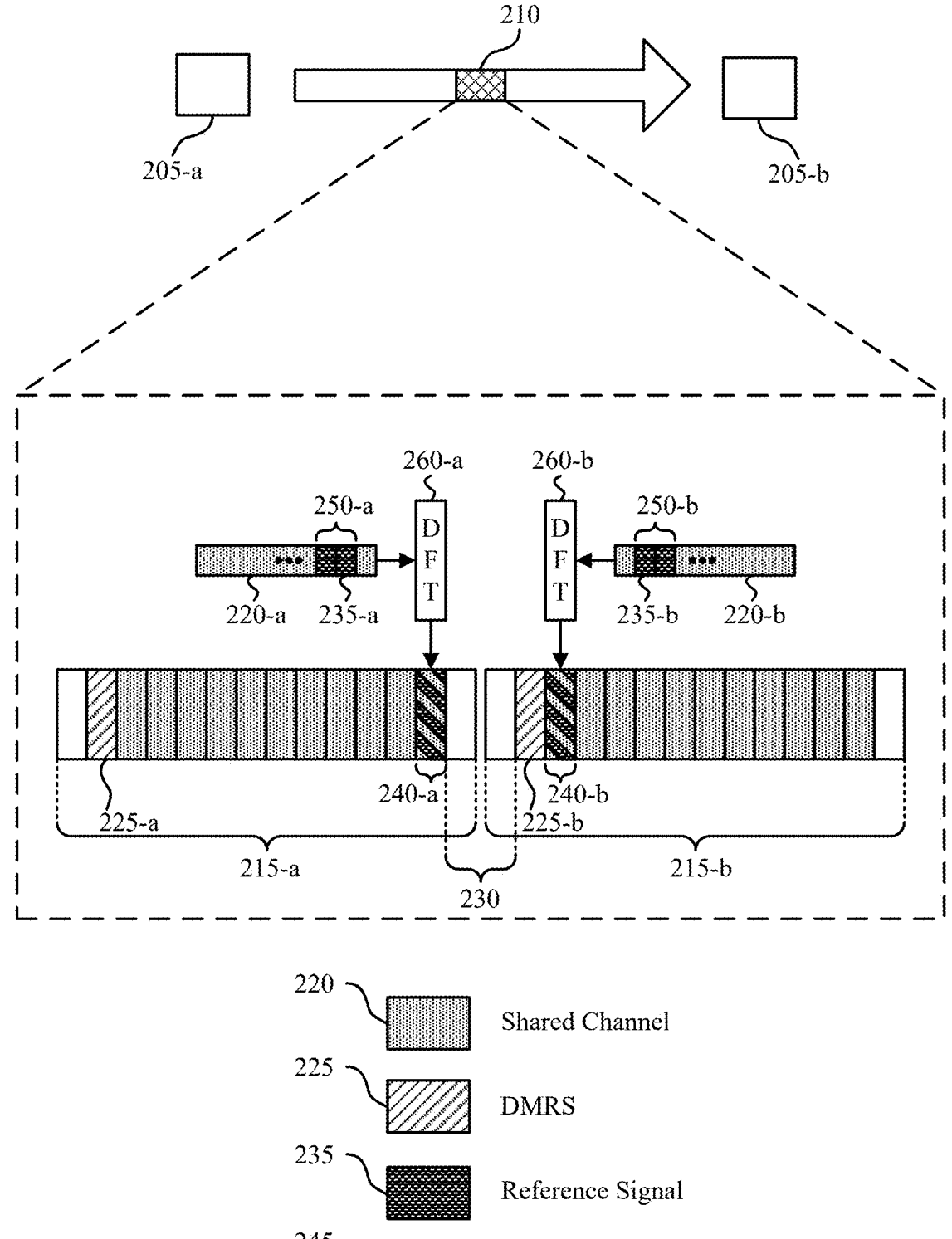
FIG. 2 shows an example of a wireless communications system that supports reference signals for phase jump boundaries in accordance with one or more aspects of the present disclosure.

FIG. 2 shows an example of a wireless communications system 200 that supports reference signals for phase jump boundaries in accordance with one or more aspects of the present disclosure. In some examples, the wireless communications system 200 may implement aspects of the wireless communications system 100. For example, the wireless communications system 200 includes a first wireless device 205-a and a second wireless device 205-b, which may each be examples of a UE 115 or a network entity 105 described with reference to FIG. 1. Additionally, or alternatively, the first wireless device 205-a and the second wireless device 205-b may each be examples of other types of wireless devices, such as an IAB node or another type of transmitter or receiver. In some examples, the first wireless device 205-a and the second wireless device 205-b may be the same type of device, while in other examples the first wireless device 205-a may be a different type of device than the second wireless device 205-b. As described herein, operations performed by the first wireless device 205-a and the second wireless device 205-b may be respectively performed by a UE 115, a network entity 105, or another wireless device, and the examples shown should not be construed as limiting.

In some examples, the first wireless device 205-a may transmit a data transmission 210 over multiple slots 215 (e.g., a first slot 215-a and a second slot 215-b). The first wireless device 205-a may transmit the data transmission 210 via a shared channel 220, which may be any shared channel that carries data for one or more users, such as a PDSCH, PUSCH, or PSSCH, among other examples). In some approaches, each slot 215 may include a DMRS 225 (e.g., a first DMRS 225-a in the first slot 215-a or a second DMRS 225-b in the second slot 215-b) that may be multiplexed with the data and used to aid a receiving device (e.g., the second wireless device 205-b) in decoding the data transmission. For example, the second wireless device 205-b may utilize one or more previous DMRSs 225 to decode the shared channel 220 in the second slot 215-b.

Phase continuity may be an issue for fluid SLIVs and DMRS 225 sharing across multiple SLIVs, where a SLIV may define a start symbol and a quantity of consecutive symbols for shared data allocation using a quantity (e.g., value or number). For instance, one or more DMRS ports associated with one or more DMRS 225 transmissions in each slot 215 may lack coherence (e.g., phase coherence), and a difference in phase between the first slot 215-a and the second slot 215-b may affect decoding efficiency (e.g., because independent phase changes, or phase "jumps," may be estimated per port). A phase jump boundary 230 may be a time or time period in which a phase jump occurs. In the example of FIG. 1, the phase jump boundary 230 occurs with a transition from the first slot 215-a to the second slot 215-b (e.g., between the first slot 215-a and the second slot 215-b). In other examples, the phase jump boundary 230 may occur within a slot (e.g., with a transition between sub-slots), with a subframe boundary (e.g., between subframes), with a frame boundary (e.g., between frames), or at another time. For instance, the phase jump boundary 230 may be located after the start of the shared channel 220 and before the end of the shared channel 220, or in the middle of shared resources identified by a single SLIV associated with the shared channel 220. In some aspects, first shared resources (e.g., a first shared channel or a first portion of a shared channel) may be followed in time by the phase jump boundary 230, followed in time by second shared resources (e.g., a second shared channel or a second portion of the shared channel).

A phase jump may affect phase estimation, joint channel estimation, or decoding at the second wireless device 205-b. One or more reference signals 235 (e.g., an additional reference signal, a phase difference estimation reference signal, a phase change estimation reference signal, a relatively low density reference signal, or a glue reference signal), may be included with the data transmission 210 to assist the second wireless device 205-b in determining the phase change between the consecutive slots.

A reference signal 235 may be a signal (e.g., electromagnetic signal, RF signal) with one or more established characteristics (e.g., signaling pattern, strength, amplitude, magnitude, frequency, timing, modulation, phase, or data, among other examples). For instance, the first wireless device 205-a or the second wireless device 205-b may store information indicating one or more of the characteristics of the reference signal 235, which may allow for comparison of one or more stored characteristics and one or more characteristics of the received reference signal 235. The reference signal 235 (e.g., the comparison) may enable calculation of one or more signal or channel characteristics (e.g., phase, channel estimate, channel attenuation, frequency shift, or Doppler effects, among other examples). In some examples, the reference signal(s) 235 may be separate from (or different from) another reference signal(s), such as a reference signal of a synchronization signal block (SSB), a channel state information reference signal (CSI-RS), a positioning reference signal (PRS), a sounding reference signal (SRS), a DMRS, or a tracking reference signal (TRS), among other examples.

Time locations of the first reference signal 235-a or the second reference signal 235-b may impact performance (e.g., phase estimation performance, channel estimation performance, or decoding performance). In some examples, a first reference signal 235-a may be located near (e.g., at or adjacent to) the end of the first slot 215-a (e.g., in the first symbol 240-a) before the phase jump boundary 230 or a second reference signal 235-b (or a DMRS 225-a) may be located near (e.g., at or adjacent to) the beginning of the second slot 215-b (e.g., in the second symbol 240-b). The placement of the reference signals (e.g., the first reference signal 235-a and the second reference signal 235-b) around the potential logical or physical gap in which a phase jump or gain state change may occur (e.g., the phase jump boundary 230) may allow the second wireless device 205-b to estimate the phase jump and perform decoding or joint channel estimation. One or more other resources in the first slot 215-a or the second slot 215-b may be occupied by one or more reserved resources 245, which may be reserved for uplink signaling, downlink signaling, sidelink signaling, or for another purpose.

The first wireless device 205-a or the second wireless device 205-b may communicate the first symbol 240-a that is before the phase jump boundary 230 in the time domain. As used herein, the term "communicate" and variations thereof may refer to transmission, outputting, reception, obtaining, or a combination thereof. For example, communicating may include transmitting, outputting, receiving, obtaining, or a combination thereof. The first symbol 240-a may include a first reference signal 235-a corresponding to (or indicated via) one or more bits 250-a (or mapped to a first set of one or more resource elements). The first reference signal 235-a may be multiplexed with first shared channel data 220-a in the time domain before the multiplexed first reference signal 235-a and first shared channel data 220-a are converted from the time domain to a frequency domain by a first DFT 260-a. For instance, the first wireless device 205-a may multiplex the first reference signal 235-a with the first shared channel data 220-a and may perform the first DFT 260-a on the multiplexed first reference signal 235-a and first shared channel data 220-a. The multiplexed first reference signal 235-a and first shared channel data 220-a that has been transformed to the frequency domain may be transmitted in the first symbol 240-a.

The first wireless device 205-a or the second wireless device 205-b may communicate (e.g., transmit or receive) the second symbol 240-b that is after the phase jump boundary 230 in the time domain. The second symbol 240-b may include a second reference signal 235-b corresponding to (or indicated via) one or more bits 250-b (or mapped to a second set of one or more resource elements). The second reference signal 235-b may be multiplexed with second shared channel data 220-b in the time domain before the multiplexed second reference signal 235-b and second shared channel data 220-b are converted from the time domain to the frequency domain by a second DFT 260-b. For instance, the first wireless device 205-a may multiplex the second reference signal 235-b with the second shared channel data 220-b and may perform the second DFT 260-b on the multiplexed second reference signal 235-b and second shared channel data 220-b. The multiplexed second reference signal 235-b and second shared channel data 220-b that has been transformed to the frequency domain may be transmitted in the second symbol 240-b.

In some approaches, symbol domain allocation for the first reference signal 235-a or the second reference signal 235-b may be performed such that the first reference signal 235-a and the second reference signal 235-b (e.g., DFT spread (DFT-s) glue reference signals) may be positioned at two sides of the phase jump boundary 230. In some examples, the first reference signal 235-a (e.g., the first symbol 240-a) may be positioned immediately adjacent to (e.g., before) the phase jump boundary 230. In some examples, the first reference signal 235-*a* (e.g., the first symbol 240-*a*) may be positioned within a threshold quantity of symbols (e.g., 1, 2, 3, 4, or another quantity of symbols) from the phase jump boundary 230 (e.g., before the phase jump boundary 230). Additionally, or alternatively, the second reference signal 235-*b* (e.g., the second symbol 240-*b*) may be positioned immediately adjacent to (e.g., after) the phase jump boundary 230. In some examples, the second reference signal 235-*b* (e.g., the second symbol 240-*b*) may be positioned within a threshold quantity of symbols (e.g., 1, 2, 3, 4, or another quantity of symbols) from the phase jump boundary 230 (e.g., after the phase jump boundary 230). Enhanced performance may be achieved by placing the first reference signal 235-*a* or the second reference signal 235-*b* to the phase jump boundary 230. For instance, the closer the first reference signal 235-*a* and the second reference signal 235-*b* are in time (e.g., the closer to the phase jump boundary 230), the more performance (e.g., phase estimation or decoding accuracy) may be enhanced.

In some aspects, the second symbol 240-*b* may be positioned before or after a symbol that carries a second DMRS 225-*a* after the phase jump boundary 230. For instance, because the second reference signal 235-*b* (e.g., a DFT-s glue reference signal) may not share the same waveform with the second DMRS 225-*a*, the second reference signal may not be positioned in the same symbol. In some approaches, if a collision is detected (e.g., if the second DMRS 225-*a* and the second reference signal 235-*b* are scheduled for the same symbol), the second reference signal 235-*b* may be positioned (e.g., rescheduled) in a symbol after the second DMRS 225-*b* (e.g., in the next symbol after the second DMRS 225-*b* or in the second symbol 240-*b*).

In some examples, the first shared channel data 220-*a* may be communicated before the phase jump boundary 230 via first DFT-s-OFDM symbols. Additionally, or alternatively, the second shared channel data 220-*b* may be communicated after the phase jump boundary 230 via second DFT-s-OFDM symbols. FIG. 2 may be an example of a DFT-s-OFDM waveform.

In some approaches, the first wireless device 205-*a* may utilize a time domain reference signal 235 that occupies M resource elements (e.g., M resource elements corresponding to the first set of one or more bits 250-*a* or corresponding to the second set of one or more bits 250-*b*) for each reference signal group, and may multiplex the reference signal 235 with DFT spread (DFT-s) shared channel symbols in the time domain. A shared channel may be, for example, a PUSCH or a PDSCH. As used herein, PxSCH refers a physical shared channel of any direction, and thus one example of a PxSCH is a PUSCH and another example of PxSCH is a PDSCH.

In some examples, the first reference signal 235-*a* may include a first random sequence or the second reference signal 235-*b* may include a second random sequence. For instance, a reference signal 235 (e.g., the first reference signal 235-*a* or the second reference signal 235-*b*) may be a DFT-s phase tracking reference signal (PTRS) utilizing a random quadrature phase shift keying (QPSK) sequence from the PTRS. In some aspects, the first reference signal 235-*a* and the second reference signal 235-*b* may include the same sequence or may include scrambled variations of a base sequence. For instance, the first reference signal 235-*a* may be based on a base sequence with a first scrambling (which may be based on an associated slot index or symbol index, for instance), and the second reference signal 235-*b* may be based on the same base sequence with a second scrambling (which may be based on an associated slot index or symbol index, for instance). Utilizing the same base sequence with different scrambling may allow a wireless device (e.g., receiving wireless device) to descramble one or more sequences of the first reference signal 235-*a* or the second reference signal 235-*b* to compare phase or to estimate the phase jump.

In some approaches, the first shared channel data 220-*a* may be first PUSCH data and the second shared channel data 220-*b* may be second PUSCH data. For instance, the first wireless device 205-*a* may be a UE or the second wireless device 205-*b* may be a network entity. The second wireless device 205-*b* may demultiplex the first reference signal 235-*a* from the first shared channel data 220-*a*. Additionally, or alternatively, the second wireless device 205-*b* may demultiplex the second reference signal 235-*b* from the second shared channel data 220-*b*.

In some examples, the first shared channel data 220-*a* may be first PDSCH data and the second shared channel data 220-*b* may be second PDSCH data. For instance, the first wireless device 205-*a* may be a network entity or the second wireless device 205-*b* may be a UE. The second wireless device 205-*b* may demultiplex the first reference signal 235-*a* from the first shared channel data 220-*a*. Additionally, or alternatively, the second wireless device 205-*b* may demultiplex the second reference signal 235-*b* from the second shared channel data 220-*b*. FIGS. 3-6 provide additional examples of reference signals 235.

In some approaches, a reference signal 235 may be multiplexed with a shared channel 220 (e.g., DFT-s PxSCH) in the time domain, which may help to reduce reference signal overhead. In some examples, the shared channel 220 (e.g., DFT-s PxSCH) may be rate matched around a reference signal 235 in the time domain. For instance, At least a portion of the first shared channel data 220-*a* may be rate-matched to the first reference signal 235-*a* in the time domain or at least a portion of the second shared channel data 220-*b* may be rate-matched to the second reference signal 235-*b* in the time domain.

In some aspects, the reference signal overhead may be utilized in a transport block size (TBS) calculation (based on the presence of the reference signal 235, for example). For instance, a TBS of the first shared channel data 220-*a* may be based on the first reference signal 235-*a* being included in the first symbol 240-*a*. Additionally, or alternatively, a TBS of the second shared channel data 220-*b* may be based on the second reference signal 235-*b* being included in the second symbol 240-*b*.

In some approaches, the shared channel 220 (e.g., DFT-s PxSCH) may be punctured by the reference signal 235 in the time domain. For example, at least a portion of the first shared channel data 220-*a* may be punctured in the time domain based on the first reference signal 235-*a* being included in the first symbol 240-*a*. Additionally, or alternatively, at least a portion of the second shared channel data 220-*b* may be punctured in the time domain based on the second reference signal 235-*b* being included in the second symbol 240-*b*. In some approaches, rate matching may have increased complexity relative to puncturing when the reference signal 235 has a relatively low density.

Figure 3:
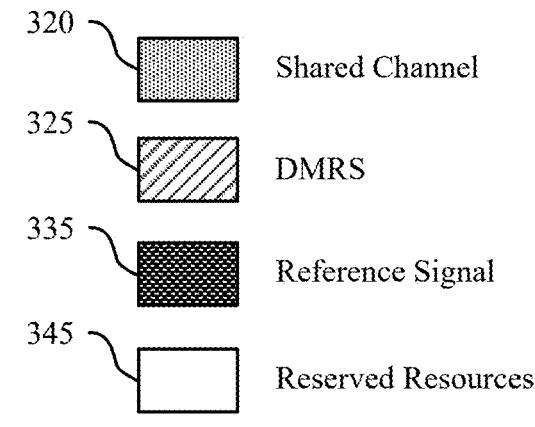
FIG. 3 shows an example of a resource diagram that supports reference signals for phase jump boundaries in accordance with one or more aspects of the present disclosure.
Figure 3:
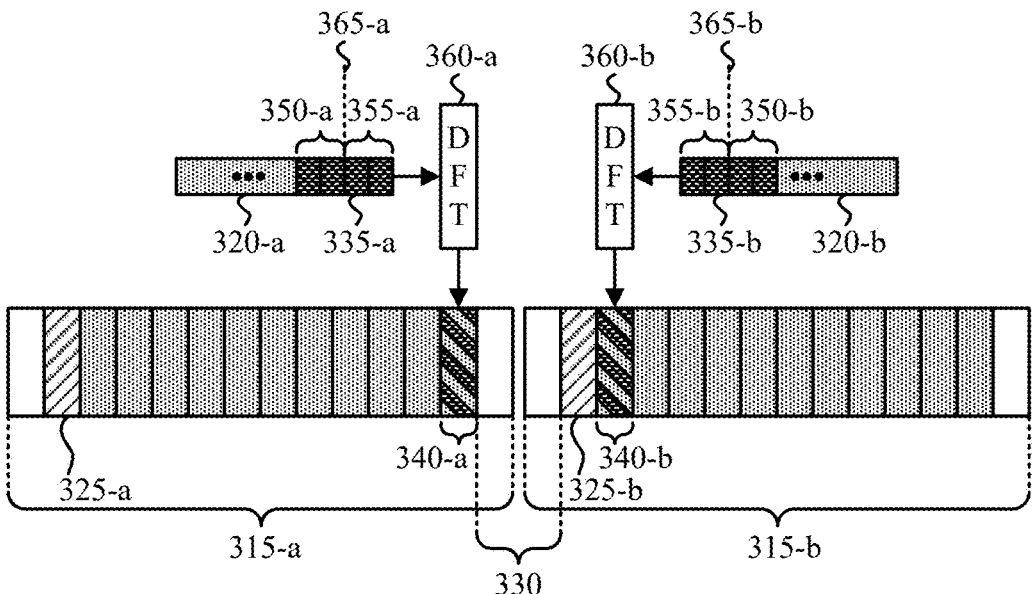

FIG. 3 shows an example of a resource diagram 300 that supports reference signals for phase jump boundaries in accordance with one or more aspects of the present disclosure. In some examples, one or more of the signals, data, or symbols described with reference to the resource diagram 300 may be communicated between a first wireless device 205-*a* and a second wireless device 205-*b* as described with reference to FIG. 2. In some aspects, one or more of the signals, data, symbols, or operations described with reference to FIG. 3 may be respective examples of corresponding elements described with reference to FIG. 2.

As illustrated in FIG. 3, a data transmission may be performed over multiple slots 315 (e.g., a first slot 315-*a* and a second slot 315-*b*). Each slot can be divided into a quantity of symbols in the time domain (as illustrated, 14 symbols). The data transmission may be carried via a shared channel 320, which may be any shared channel that carries data for one or more users, such as a PDSCH, PUSCH, or PSSCH, among other examples. In some approaches, each slot 315 may include a DMRS 325 (e.g., a first DMRS 325-*a* in the first slot 315-*a* or a second DMRS 325-*b* in the second slot 315-*b*) that may be multiplexed with the data and used to aid a receiving device in decoding the data transmission. For example, one or more DMRSs 325 may be utilized to decode the shared channel 320 in the second slot 315-*b*.

A phase jump boundary 330 is illustrated in FIG. 3. In the example of FIG. 3, the phase jump boundary 330 occurs with a transition from the first slot 315-*a* to the second slot 315-*b* (e.g., between the first slot 315-*a* and the second slot 315-*b*). In other examples, the phase jump boundary 330 may occur within a slot (e.g., with a transition between sub-slots), with a subframe boundary (e.g., between subframes), with a frame boundary (e.g., between frames), or at another time. One or more resources in the first slot 315-*a* or the second slot 315-*b* may be occupied by one or more reserved resources 345, which may be reserved for uplink signaling, downlink signaling, sidelink signaling, or for another purpose.

One or more reference signals 335 (e.g., an additional reference signal, a phase difference estimation reference signal, a phase change estimation reference signal, a relatively low density reference signal, or a glue reference signal), may be included with the data transmission. For instance, one or more first reference signals 335-*a* and one or more second reference signals 335-*b* may be utilized to estimate the phase change between the first slot 315-*a* and the second slot 315-*b*.

A first symbol 340-*a* may be positioned before the phase jump boundary 330 in the time domain. The first symbol 340-*a* may include one or more first reference signals 335-*a* corresponding to one or more first sets 350-*a*, 355-*a* of one or more bits (or resource elements). The first reference signal(s) 335-*a* may be multiplexed with first shared channel data 320-*a* in the time domain before the multiplexed first reference signal(s) 335-*a* and first shared channel data 320-*a* are converted from the time domain to a frequency domain by a first DFT 360-*a*. The multiplexed first reference signal (s) 335-*a* and first shared channel data 320-*a* that has been transformed to the frequency domain may be transmitted in the first symbol 340-*a*.

A second symbol 340-*b* may be positioned after the phase jump boundary 330 in the time domain. The second symbol 340-*b* may include one or more second reference signals 335-*b* corresponding to one or more second sets 350-*b*, 355-*b* of one or more bits (or resource elements). The second reference signal(s) 335-*b* may be multiplexed with second shared channel data 320-*b* in the time domain before the multiplexed second reference signal(s) 335-*b* and second shared channel data 320-*b* are converted from the time domain to the frequency domain by a second DFT 360-*b*. The multiplexed second reference signal(s) 335-*b* and second shared channel data 320-*b* that has been transformed to the frequency domain may be transmitted in the second symbol 340-*b*.

In some examples, the first symbol 340-*a* may include multiple first reference signals 335-*a*. Each of the multiple first reference signals 335-*a* may correspond to (e.g., may be indicated via) a respective one of multiple first sets 350-*a*, 355-*a* of one or more bits. In a time domain allocation, for instance, N reference signal groups may be utilized, where each reference signal group may occupy M resource elements. In the example of FIG. 3, N=2 reference signal groups (e.g., reference signal group #0 and reference signal group #1) may occupy M=2 resource elements for each of the first set 350-*a* and the first set 355-*a*.

In some examples, the second symbol 340-*b* may include multiple second reference signals 335-*b*. Each of the multiple second reference signals 335-*b* may correspond to (e.g., may be indicated via) a respective one of multiple second sets 350-*b*, 355-*b* of one or more bits. In the example of FIG. 3, N=2 reference signal groups (e.g., reference signal group #0 and reference signal group #1) may occupy M=2 resource elements for each of the second set 350-*b* and the second set 355-*b*.

In some aspects, a quantity of the multiple first reference signals 335-*a* or a quantity of the one or more bits (or resource elements) in each of the multiple first sets 350-*a*, 355-*a* may be based on a quantity of resource blocks allocated for the first shared channel data 320-*a*. Additionally, or alternatively, a quantity of the multiple second reference signals 335-*b* or a quantity of the one or more bits (or resource elements) in each of the multiple second sets 350-*b*, 355-*b* may be based on a quantity of resource blocks allocated for the second shared channel data 320-*b*. For instance, N or M may be a function of the quantity of resource blocks allocated for the shared channel 320 (e.g., PxSCH, PUSCH, PDSCH, or PSSCH, among other examples). In some examples, the larger the bandwidth of the shared channel 320, the larger N or M may be (e.g., which may reduce a quantity or proportion of reference signal overhead).

In some approaches, the first reference signal(s) 335-*a* (e.g., the first set(s) 350-*a*, 355-*a* of one or more bits) may be positioned at an end of the first symbol 340-*a* in the time domain. The second reference signal(s) 335-*b* (e.g., the second set(s) 350-*b*, 355-*b* of one or more bits) may be positioned at a beginning of the second symbol 340-*b* in the time domain. For the placement of a reference signal group, for instance, one or more reference signal groups may be clustered at the beginning or at the end of a DFT-s-OFDM symbol based on the phase jump boundary 330 location. Before the phase jump boundary 330, for example, the one or more reference signal groups (e.g., first set(s) 350-*a*, 355-*a*) may be positioned at the end of the first symbol 340-*a*. After the phase jump boundary, for example, the one or more reference signal groups (e.g., second set(s) 350-*b*, 355-*b*) may be positioned at the beginning the second symbol 340-*b*. In some examples, DFT-s-OFDM may involve sampling a time-domain signal at a rate in accordance with the Nyquist-Shannon sampling theorem, resulting in a discrete set of time-domain samples. Depending on the sampling rate, a single bit may be sampled once or more than once. In some approaches, the time-domain samples may be segmented into blocks of samples (e.g., blocks of L samples). For each block of L samples, a DFT may be applied, thereby generating one or more frequency-domain symbols. The frequency domain symbol(s) may be mapped onto OFDM subcarriers, which may be modulated onto the subcarriers using an Inverse Fast Fourier Transform (IFFT) to generate a symbol to be transmitted. As described herein, one or more reference signal groups being positioned at the end or the beginning of a modulation symbol may refer to the time domain positioning of the time samples before segmentation into blocks in the DFT-s-OFDM scheme. For example, reference signal groups may be clustered at the end or the beginning of the time domain samples that are ultimately represented in a transmitted modulated symbol.

In some aspects, the first symbol 340-*a* may include multiple first reference signals 335-*a* with a first gap 365-*a* between at least two of the multiple first reference signals 335-*a* in the time domain. The second symbol 340-*b* may include multiple second reference signals 335-*b* with a second gap 365-*b* between at least two of the multiple second reference signals 335-*b* in the time domain. For instance, a configurable or fixed first gap 365-*a* between first sets 350-*a* and 355-*a* may be utilized. Additionally, or alternatively, a configurable or fixed second gap 365-*b* between second sets 350-*b* and 355-*b* may be utilized. In some approaches, a wireless device may receive configuration information (e.g., a UE may receive configuration information from a network entity) indicating the first gap 365-*a* or the second gap 365-*b*, or a combination thereof. The configuration information may indicate whether a gap is configured or a size (e.g., quantity of time of) the gap. In some aspects, a gap (e.g., the first gap 365-*a* or the second gap 365-*b*) may be utilized to reduce (e.g., minimize) the Doppler shift captured by two reference signal symbols (e.g., the first symbol 340-*a* and the second symbol 340-*b*) across the phase jump boundary 330.

Figure 4:
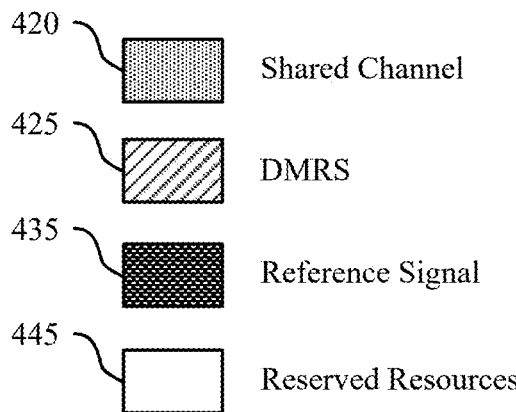
FIG. 4 shows an example of a resource diagram that supports reference signals for phase jump boundaries in accordance with one or more aspects of the present disclosure.
Figure 4:
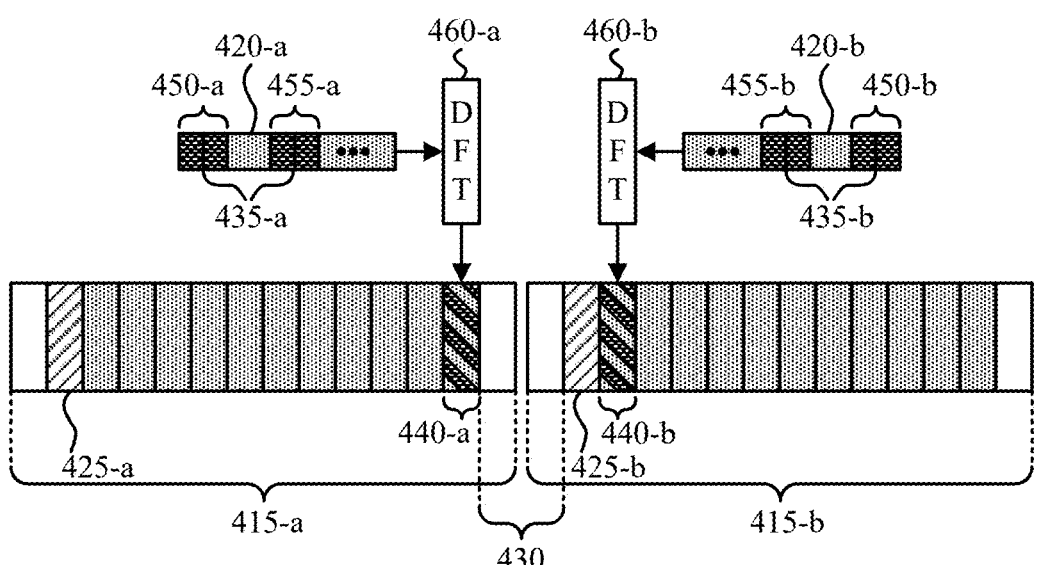

FIG. 4 shows an example of a resource diagram 400 that supports reference signals for phase jump boundaries in accordance with one or more aspects of the present disclosure. In some examples, one or more of the signals, data, or symbols described with reference to the resource diagram 400 may be communicated between a first wireless device 205-*a* and a second wireless device 205-*b* as described with reference to FIG. 2. In some aspects, one or more of the signals, data, symbols, or operations described with reference to FIG. 4 may be respective examples of corresponding elements described with reference to FIG. 2.

As illustrated in FIG. 4, a data transmission may be performed over multiple slots 415 (e.g., a first slot 415-*a* and a second slot 415-*b*). The data transmission may be carried via a shared channel 420, which may be any shared channel that carries data for one or more users, such as a PDSCH, PUSCH, or PSSCH, among other examples. In some approaches, each slot 415 may include a DMRS 425 (e.g., a first DMRS 425-*a* in the first slot 415-*a* or a second DMRS 425-*b* in the second slot 415-*b*) that may be multiplexed with the data and used to aid a receiving device in decoding the data transmission. For example, one or more DMRSs 425 may be utilized to decode the shared channel 420 in the second slot 415-*b*.

A phase jump boundary 430 is illustrated in FIG. 4. In the example of FIG. 4, the phase jump boundary 430 occurs with a transition from the first slot 415-*a* to the second slot 415-*b* (e.g., between the first slot 415-*a* and the second slot 415-*b*). In other examples, the phase jump boundary 430 may occur within a slot (e.g., with a transition between sub-slots), with a subframe boundary (e.g., between subframes), with a frame boundary (e.g., between frames), or at another time. One or more resources in the first slot 415-*a* or the second slot 415-*b* may be occupied by one or more reserved resources 445, which may be reserved for uplink signaling, downlink signaling, sidelink signaling, or for another purpose.

One or more reference signals 435 (e.g., an additional reference signal, a phase difference estimation reference signal, a phase change estimation reference signal, a relatively low density reference signal, or a glue reference signal), may be included with the data transmission. For instance, one or more first reference signals 435-*a* and one or more second reference signals 435-*b* may be utilized to estimate the phase change between the first slot 415-*a* and the second slot 415-*b*.

A first symbol 440-*a* may be positioned before the phase jump boundary 430 in the time domain. The first symbol 440-*a* may include one or more first reference signals 435-*a* corresponding to one or more first sets 450-*a*, 455-*a* of one or more bits (or resource elements). The first reference signal(s) 435-*a* may be multiplexed with first shared channel data 420-*a* in the time domain before the multiplexed first reference signal(s) 435-*a* and first shared channel data 420-*a* are converted from the time domain to a frequency domain by a first DFT 460-*a*. The multiplexed first reference signal(s) 435-*a* and first shared channel data 420-*a* that has been transformed to the frequency domain may be transmitted in the first symbol 440-*a*.

A second symbol 440-*b* may be positioned after the phase jump boundary 430 in the time domain. The second symbol 440-*b* may include one or more second reference signals 435-*b* corresponding to one or more second sets 450-*b*, 455-*b* of one or more bits (or resource elements). The second reference signal(s) 435-*b* may be multiplexed with second shared channel data 420-*b* in the time domain before the multiplexed second reference signal(s) 435-*b* and second shared channel data 420-*b* are converted from the time domain to the frequency domain by a second DFT 460-*b*. The multiplexed second reference signal(s) 435-*b* and second shared channel data 420-*b* that has been transformed to the frequency domain may be transmitted in the second symbol 440-*b*.

In some examples, the first symbol 440-*a* may include multiple first reference signals 435-*a*. Each of the multiple first reference signals 435-*a* may be included in a respective one of multiple first sets 450-*a*, 455-*a* of one or more bits (or resource elements). In the example of FIG. 4, N=2 reference signal groups (e.g., reference signal group #0 and reference signal group #1) may occupy M=2 resource elements for each of the first set 450-*a* and the first set 455-*a*.

In some examples, the second symbol 440-*b* may include multiple second reference signals 435-*b*. Each of the multiple second reference signals 435-*b* may be included in a respective one of multiple second sets 450-*b*, 455-*b* of one or more bits (or resource elements). In the example of FIG. 4, N=2 reference signal groups (e.g., reference signal group #0 and reference signal group #1) may occupy M=2 resource elements for each of the second set 450-*b* and the second set 455-*b*.

In some aspects, the one or more first reference signals 435-*a* are evenly distributed across a frequency domain resource allocation (FDRA) associated with the first symbol 440-*a*. Additionally, or alternatively, the one or more second reference signals 435-*b* are evenly distributed across an FDRA associated with the second symbol 440-*b*. For time domain allocation, for instance, one or more reference signal groups (e.g., the first sets 450-*a*, 455-*a* or the second sets 450-*b*, 455-*b*) may be evenly distributed across an FDRA for the shared channel 420 (e.g., PUSCH, PDSCH, or PSSCH, among other examples). For instance, PTRS groups may be evenly distributed across an FDRA. Evenly distributing reference signal groups (e.g., the first sets 450-*a*, 455-*a* or the second sets 450-*b*, 455-*b*) may allow a wireless device (e.g., a receiving wireless device) to average out the interference and perform an improved phase estimate when short term interference correlation occurs.

Figure 5:
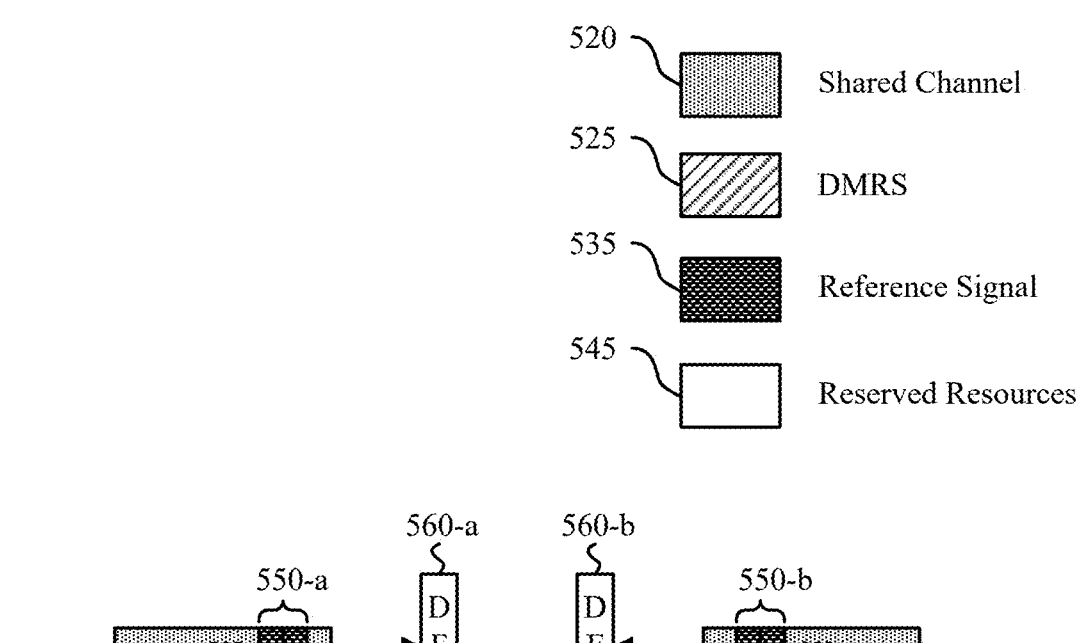
FIG. 5 shows an example of a resource diagram that supports reference signals for phase jump boundaries in accordance with one or more aspects of the present disclosure.
Figure 5:
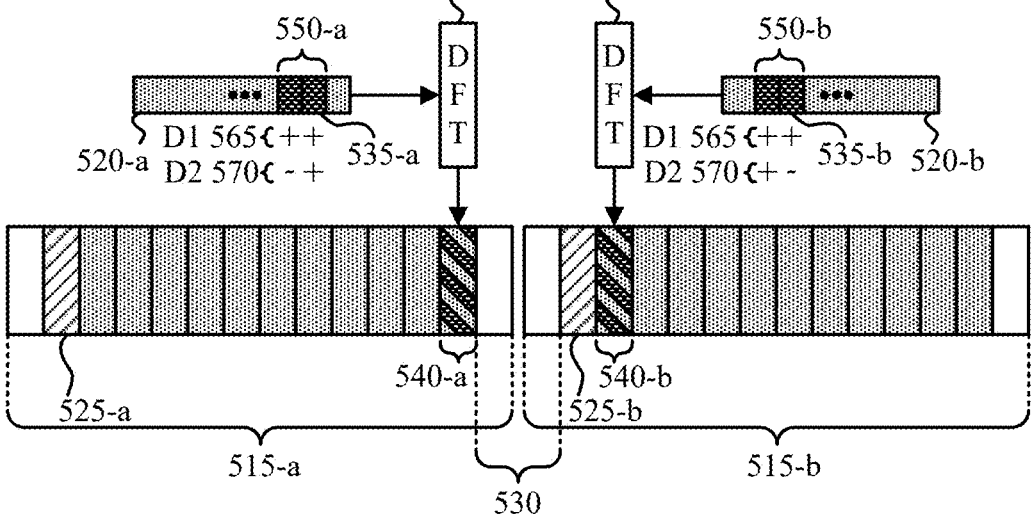

FIG. 5 shows an example of a resource diagram 500 that supports reference signals for phase jump boundaries in accordance with one or more aspects of the present disclosure. In some examples, one or more of the signals, data, or symbols described with reference to the resource diagram 500 may be communicated between a first wireless device 205-a and a second wireless device 205-b as described with reference to FIG. 2. In some aspects, one or more of the signals, data, symbols, or operations described with reference to FIG. 5 may be respective examples of corresponding elements described with reference to FIG. 2.

As illustrated in FIG. 5, a data transmission may be performed over multiple slots 515 (e.g., a first slot 515-a and a second slot 515-b). The data transmission may be carried via a shared channel 520, which may be any shared channel that carries data for one or more users, such as a PDSCH, PUSCH, or PSSCH, among other examples. In some approaches, each slot 515 may include a DMRS 525 (e.g., a first DMRS 525-a in the first slot 515-a or a second DMRS 525-b in the second slot 515-b) that may be multiplexed with the data and used to aid a receiving device in decoding the data transmission. For example, one or more DMRSs 525 may be utilized to decode the shared channel 520 in the second slot 515-b.

A phase jump boundary 530 is illustrated in FIG. 5. In the example of FIG. 5, the phase jump boundary 530 occurs with a transition from the first slot 515-a to the second slot 515-b (e.g., between the first slot 515-a and the second slot 515-b). In other examples, the phase jump boundary 530 may occur within a slot (e.g., with a transition between sub-slots), with a subframe boundary (e.g., between subframes), with a frame boundary (e.g., between frames), or at another time. One or more resources in the first slot 515-a or the second slot 515-b may be occupied by one or more reserved resources 545, which may be reserved for uplink signaling, downlink signaling, sidelink signaling, or for another purpose.

One or more reference signals 535 (e.g., an additional reference signal, a phase difference estimation reference signal, a phase change estimation reference signal, a relatively low density reference signal, or a glue reference signal), may be included with the data transmission. For instance, one or more first reference signals 535-a and one or more second reference signals 535-b may be utilized to estimate the phase change between the first slot 515-a and the second slot 515-b.

A first symbol 540-a may be positioned before the phase jump boundary 530 in the time domain. The first symbol 540-a may include one or more first reference signals 535-a corresponding to a first set 550-a of one or more bits (or resource elements). The first reference signal(s) 535-a may be multiplexed with first shared channel data 520-a in the time domain before the multiplexed first reference signal(s) 535-a and first shared channel data 520-a are converted from the time domain to a frequency domain by a first DFT 560-a. The multiplexed first reference signal(s) 535-a and first shared channel data 520-a that has been transformed to the frequency domain may be transmitted in the first symbol 540-a.

A second symbol 540-b may be positioned after the phase jump boundary 530 in the time domain. The second symbol 540-b may include one or more second reference signals 535-b corresponding to a second set 550-b of one or more bits (or resource elements). The second reference signal(s) 535-b may be multiplexed with second shared channel data 520-b in the time domain before the multiplexed second reference signal(s) 535-b and second shared channel data 520-b are converted from the time domain to the frequency domain by a second DFT 560-b. The multiplexed second reference signal(s) 535-b and second shared channel data 520-b that has been transformed to the frequency domain may be transmitted in the second symbol 540-b.

In some examples, the first symbol 540-a may include one or more first reference signals 535-a. Each of the one or more first reference signals 535-a may be included in a first set 550-a of one or more bits (or resource elements). In the example of FIG. 5, N=1 reference signal group may occupy M=2 resource elements for the first set 550-a.

In some examples, the second symbol 540-b may include one or more second reference signals 535-b. Each of the one or more second reference signals 535-b may be included in a second set 550-b of one or more bits (or resource elements). In the example of FIG. 5, N=1 reference signal group may occupy M=2 resource elements for the second set 550-b.

In uplink multi-user MIMO (MU-MIMO), shared channels (e.g., PUSCHs) from different devices (e.g., wireless devices, UEs, or network entities, among other examples) may be non-coherent. One or more of the reference signals described herein may be utilized for MU-MIMO. In some examples, orthogonal cover codes (OCCs) may be utilized to allow phase jump estimation per device (e.g., per wireless device, UE, or network entity, among other examples). For different devices, for example, different M OCCs (e.g., frequency domain OCCs or time domain OCCs) may be applied for at least a portion of one or more symbols (e.g., applied for the first symbol 540-a or the second symbol 540-b, or applied within the M resource elements in each reference signal group or resource element set (e.g., the first set 550-a or the second set 550-b)). In the example of FIG. 5, M=2 OCCs may be applied for each of the first set 550-a and the second set 550-b. Even when signals from devices (e.g., wireless devices, UEs, or network entities, among other examples) are space-division multiplexed, performing OCC decoding may help the receiving device to isolate reference signals from different devices.

In some approaches, a first OCC associated with a first device 565 (illustrated as "D1" for convenience) and a second OCC associated with a second device 570 (illustrated as "D2" for convenience) may be each applied to at least one resource element corresponding to the first set 550-a of one or more bits. For instance, a first OCC may be applied to one or more bits (or resource elements) of the first set 550-a. Additionally, or alternatively, a first OCC associated with a first device and a second OCC associated with a second device may be each applied to at least one resource element corresponding to the second set 550-b of one or more bits (or resource elements).

In an example where two frequency domain OCCs are utilized, a received signal via a first resource element of the first set 550-a may be expressed as $y_0 = (h_{0,i}x_{0,k} + h_{1,i}x_{1,k})$, a received signal via a second resource element of the first set 550-a may be expressed as $y_1 = (h_{0,i}x_{0,k} - h_{1,i}x_{1,k})$, a received signal via a first resource element of the second set 550-b may be expressed as $$y_0' = \left( e^{j\Delta\theta_0} h_{0,i} x_{0,k}' + e^{j\Delta\theta_1} h_{1,i} x_{1,k}' \right),$$

and a received signal via a second resource element of the second set 550-b may be expressed as $$y_1' = \left(e^{j\Delta\theta_0} h_{0,i} x_{0,k}' + e^{j\Delta\theta_1} h_{1,i} x_{1,k}'\right),$$

where y denotes a received signal, x denotes a transmitted signal, h denotes a channel, θ denotes a phase angle, j denotes the imaginary number ($\sqrt{-1}$), and i and k are index values.

Figure 6:
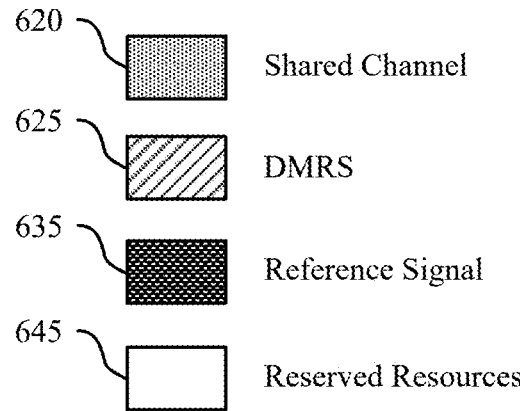
FIG. 6 shows an example of a resource diagram that supports reference signals for phase jump boundaries in accordance with one or more aspects of the present disclosure.
Figure 6:
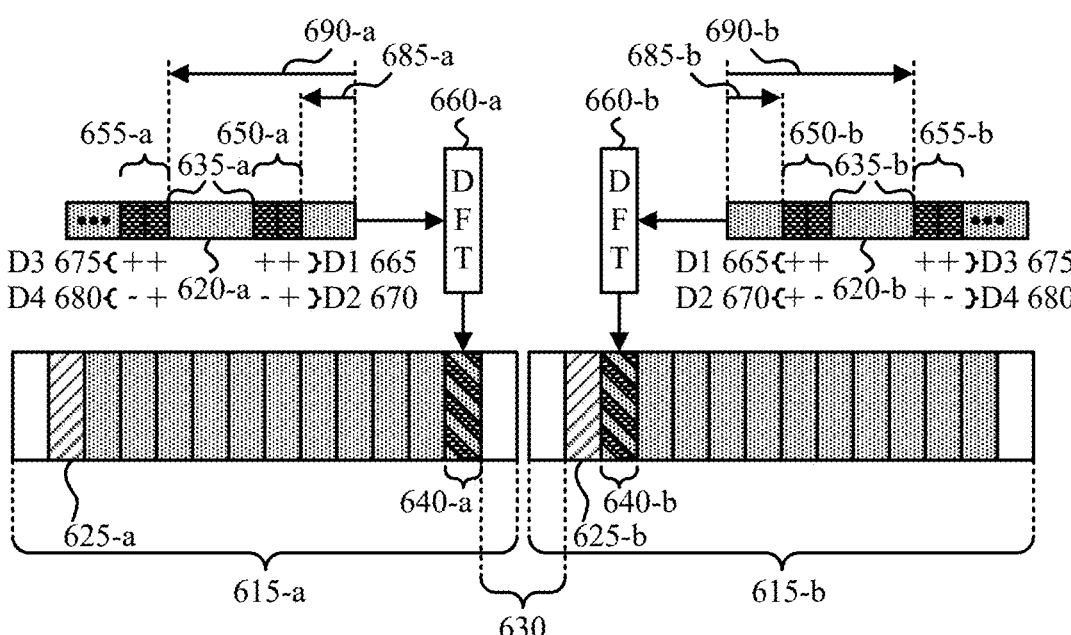

FIG. 6 shows an example of a resource diagram 600 that supports reference signals for phase jump boundaries in accordance with one or more aspects of the present disclosure. In some examples, one or more of the signals, data, or symbols described with reference to the resource diagram 600 may be communicated between a first wireless device 205-*a* and a second wireless device 205-*b* as described with reference to FIG. 2. In some aspects, one or more of the signals, data, symbols, or operations described with reference to FIG. 6 may be respective examples of corresponding elements described with reference to FIG. 2.

As illustrated in FIG. 6, a data transmission may be performed over multiple slots 615 (e.g., a first slot 615-*a* and a second slot 615-*b*). The data transmission may be carried via a shared channel 620, which may be any shared channel that carries data for one or more users, such as a PDSCH, PUSCH, or PSSCH, among other examples. In some approaches, each slot 615 may include a DMRS 625 (e.g., a first DMRS 625-*a* in the first slot 615-*a* or a second DMRS 625-*b* in the second slot 615-*b*) that may be multiplexed with the data and used to aid a receiving device in decoding the data transmission. For example, one or more DMRSs 625 may be utilized to decode the shared channel 620 in the second slot 615-*b*.

A phase jump boundary 630 is illustrated in FIG. 6. In the example of FIG. 6, the phase jump boundary 630 occurs with a transition from the first slot 615-*a* to the second slot 615-*b* (e.g., between the first slot 615-*a* and the second slot 615-*b*). In other examples, the phase jump boundary 630 may occur within a slot (e.g., with a transition between sub-slots), with a subframe boundary (e.g., between subframes), with a frame boundary (e.g., between frames), or at another time. One or more resources in the first slot 615-*a* or the second slot 615-*b* may be occupied by one or more reserved resources 645, which may be reserved for uplink signaling, downlink signaling, sidelink signaling, or for another purpose.

One or more reference signals 635 (e.g., an additional reference signal, a phase difference estimation reference signal, a phase change estimation reference signal, a relatively low density reference signal, or a glue reference signal), may be included with the data transmission. For instance, one or more first reference signals 635-*a* and one or more second reference signals 635-*b* may be utilized to estimate the phase change between the first slot 615-*a* and the second slot 615-*b*.

A first symbol 640-*a* may be positioned before the phase jump boundary 630 in the time domain. The first symbol 640-*a* may include one or more first reference signals 635-*a* corresponding to one or more first sets 650-*a*, 655-*a* of one or more bits (or resource elements). The first reference signal(s) 635-*a* may be multiplexed with first shared channel data 620-*a* in the time domain before the multiplexed first reference signal(s) 635-*a* and first shared channel data 620-*a* are converted from the time domain to a frequency domain by a first DFT 660-*a*. The multiplexed first reference signal(s) 635-*a* and first shared channel data 620-*a* that has been transformed to the frequency domain may be transmitted in the first symbol 640-*a*.

A second symbol 640-*b* may be positioned after the phase jump boundary 630 in the time domain. The second symbol 640-*b* may include one or more second reference signals 635-*b* corresponding to one or more second sets 650-*b*, 655-*b* of one or more bits (or resource elements). The second reference signal(s) 635-*b* may be multiplexed with second shared channel data 620-*b* in the time domain before the multiplexed second reference signal(s) 635-*b* and second shared channel data 620-*b* are converted from the time domain to the frequency domain by a second DFT 660-*b*. The multiplexed second reference signal(s) 635-*b* and second shared channel data 620-*b* that has been transformed to the frequency domain may be transmitted in the second symbol 640-*b*.

In some examples, the first symbol 640-*a* may include multiple first reference signals 635-*a*. Each of the multiple first reference signals 635-*a* may be included in a respective one of multiple first sets 650-*a*, 655-*a* of one or more bits (or resource elements). In the example of FIG. 6, N=2 reference signal groups (e.g., reference signal group #0 or TDM set #0 and reference signal group #1 or TDM set #1) may occupy M=2 resource elements for each of the first set 650-*a* and the first set 655-*a*.

In some examples, the second symbol 640-*b* may include multiple second reference signals 635-*b*. Each of the multiple second reference signals 635-*b* may be included in a respective one of multiple second sets 650-*b*, 655-*b* of one or more bits (or resource elements). In the example of FIG. 6, N=2 reference signal groups (e.g., reference signal group #0 or TDM set #0 and reference signal group #1 or TDM set #1) may occupy M=2 resource elements for each of the second set 650-*b* and the second set 655-*b*.

In some approaches, different reference signal groups, bit sets, or resource element sets may be distributed or spaced (e.g., uniformly spaced). Each of the reference signal groups, bit sets, or resource element sets may correspond to one or more devices (e.g., wireless devices, UEs, or network entities, among other examples). For instance, TDM may be performed with the different reference signal groups or resource element sets corresponding to different devices.

In some approaches, multiple bit sets, resource element sets, or reference signal groups may be utilized with different time offsets, where different devices (e.g., wireless devices, UEs, or network entities, among other examples) correspond to (e.g., are assigned to) different bit sets, resource element sets, or reference signal groups. A symbol may include multiple sets of one or more bits (or resource elements). Each of multiple offsets may correspond to a different offset applied to a respective set of the multiple sets of one or more bits (or resource elements). In the example of FIG. 6, for the first symbol 640-*a*, first time offsets 685-*a*, 690-*a* are utilized (e.g., configured via signaling from a network entity, established, or set) for two bit sets (or resource sets), which are time division multiplexed before the first DFT 660-*a*. For instance, the first symbol 640-*a* may include the first sets 650-*a*, 655-*a* of bits (or resource elements). A first offset 685-*a* may be applied to a first set 650-*a* of bits (or resource elements) and a different first offset 690-*a* may be applied to another first set 655-*a* of bits (or resource elements). Each of the multiple offsets 685-*a*, 690-*a* may be associated with one or more different devices. For instance, the first offset 685-*a* may be associated with a first device 665 (e.g., "D1") and a second device 670 (e.g., "D2"). The first offset 690-*a* may be associated with a third device 675 (e.g., "D3") and a fourth device 680 (e.g., "D4").

Additionally, or alternatively, for the second symbol 640-*b*, second time offsets 685-*b*, 690-*b* are utilized (e.g., configured via signaling from a network entity, established, or set) for two bit sets (or resource sets), which may be time division multiplexed before the second DFT 660-*b*. For instance, the second symbol 640-*b* may include the second sets 650-*b*, 655-*b* of bits (or resource elements). A second offset 685-*b* may be applied to a second set 650-*b* of bits (or resource elements) and a different second offset 690-*b* may be applied to another second set 655-*b* of bits (or resource elements). Each of the multiple offsets 685-*b*, 690-*b* may be associated with one or more different devices. For instance, the second offset 685-*b* may be associated with the first device 665 (e.g., "D1") and the second device 670 (e.g., "D2"). The second offset 690-*b* may be associated with the third device 675 (e.g., "D3") and the fourth device 680 (e.g., "D4").

In some approaches, offsets or TDM may be utilized in combination with OCCs. For example, each of multiple OCCs may be respectively associated with each different device, where one or more of the multiple OCCs are each applied to one or more of the multiple sets of one or more bits (or resource elements).

In the example of FIG. 6, M=2 OCCs may be applied for each of the N=2 first sets 650-*a*, 655-*a* and the N=2 second sets 650-*b*, 655-*b*. For instance, a first OCC associated with a first device 665 (e.g., "D1") and a second OCC associated with a second device 670 (e.g., "D2") may be each applied to at least one bit (or resource element) of the first set 650-*a* of one or more bits (or resource elements). A third OCC associated with a third device 675 (e.g., "D3") and a fourth OCC associated with a fourth device 680 (e.g., "D4") may be each applied to at least one bit (or resource element) of the first set 655-*a* of one or more bits (or resource elements). Additionally, or alternatively, a first OCC associated with a first device 665 (e.g., "D1") and a second OCC associated with a second device 670 (e.g., "D2") may be each applied to at least one resource element of the second set 650-*b* of one or more bits (or resource elements). A third OCC associated with a third device 675 (e.g., "D3") and a fourth OCC associated with a fourth device 680 (e.g., "D4") may be each applied to at least one bit (or resource element) of the second set 655-*b* of one or more bits (or resource elements).

Figure 7:
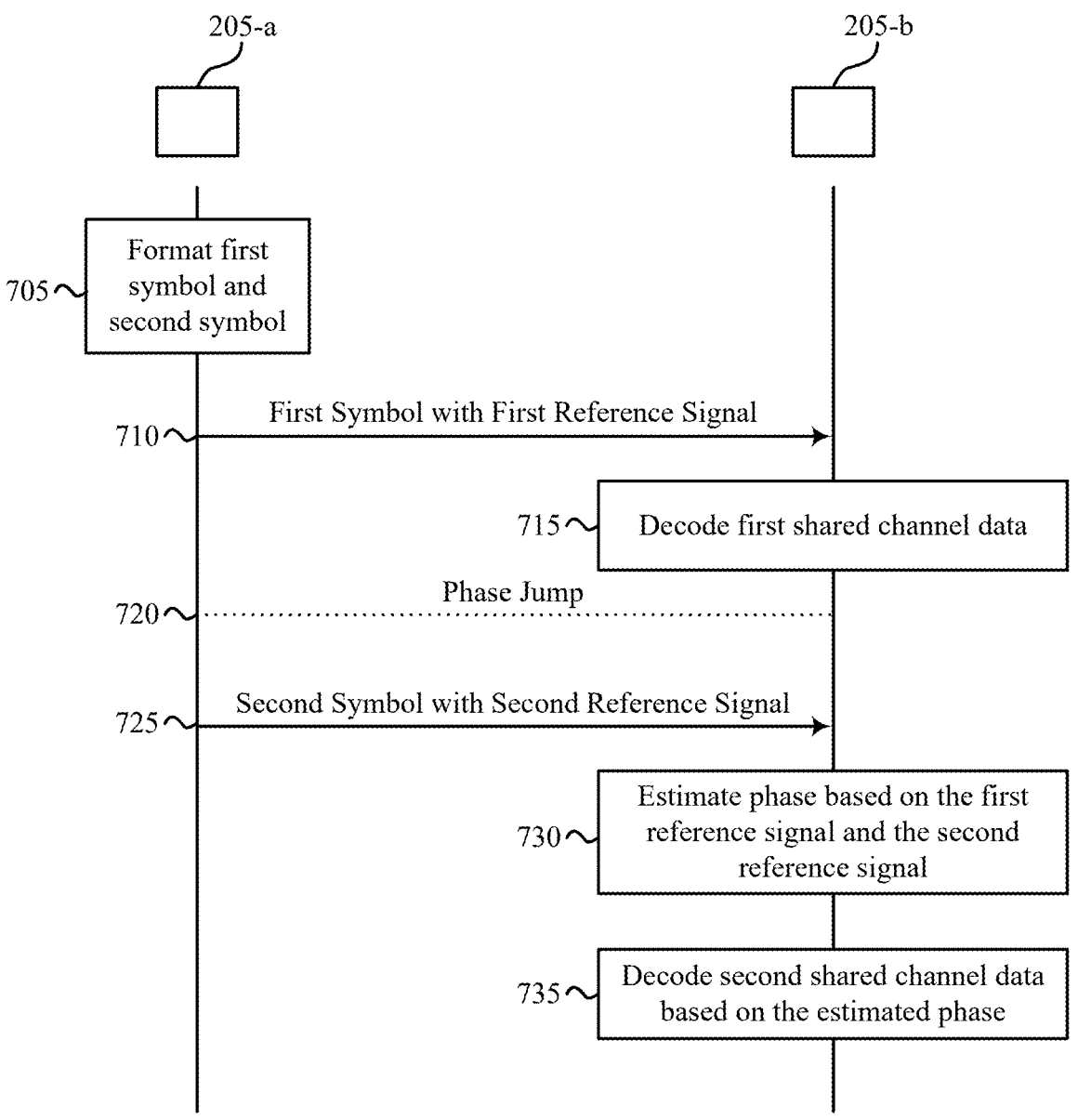
FIG. 7 shows an example of a process flow that supports reference signals for phase jump boundaries in accordance with one or more aspects of the present disclosure.

FIG. 7 shows an example of a process flow 700 that supports reference signals for phase jump boundaries in accordance with one or more aspects of the present disclosure. In some examples, the process flow 700 may be implemented by, or may implement aspects of, one or more of the wireless communications systems 100 or 200 or the resource diagrams 300, 400, 600, or 600. For example, the process flow 700 includes a first wireless device 205-*a* (e.g., a transmitting device) and a second wireless device 205-*b* (e.g., a receiving device), which may each be examples of a UE 115, a network entity 105, or another type of device described with reference to FIGS. 1 and 2. In some examples, one or more of the described operations may be performed in a different order than shown. In some approaches, some of the operations described may be performed at different times or in overlapping time windows (e.g., concurrently). In some aspects, one or more operations may be divided (and performed separately) or multiple operations may be combined. Additionally, or alternatively, one or more operations may be added or omitted. Although the first wireless device 205-*a* and the second wireless device 205-*b* are shown performing the operations of the process flow 700, some aspects of some operations may also be performed by one or more other wireless devices.

At 705, the first wireless device 205-*a* may format a first symbol and a second symbol. For instance, the first wireless device 205-*a* may format a first symbol and a second symbol as described with reference to one or more of FIGS. 2-6. In some examples, the first wireless device 205-*a* may multiplex one or more reference signals in one or more bit sets (or resource element sets) with shared channel data and may transform the multiplexed information into the frequency domain via a DFT. The first symbol may be positioned (e.g., scheduled) before a phase jump boundary, or the second symbol may be positioned (e.g., scheduled) after a phase jump boundary.

At 710, the first wireless device 205-*a* may transmit, or the second wireless device 205-*b* may receive, the first symbol with a first reference signal to the second wireless device 205-*b*. For instance, the first wireless device 205-*a* may transmit the first symbol to the second wireless device 205-*b* as described with reference to one or more of FIGS. 2-6.

At 715, the second wireless device 205-*b* may decode first shared channel (e.g., PxSCH) data. For instance, the first wireless device 205-*a* may decode first shared channel data based on a DMRS as described with reference to FIG. 2.

At 720, a phase jump may occur. For instance, a phase jump may occur between or within a slot(s), subslot(s), frame(s), or subframe(s) as described with reference to one or more of FIGS. 2-6.

At 725, the first wireless device 205-*a* may transmit, or the second wireless device 205-*b* may receive, the second symbol with a second reference signal. For instance, the first wireless device 205-*a* may transmit the second symbol to the second wireless device 205-*b* as described with reference to one or more of FIGS. 2-6.

At 730, the second wireless device 205-*b* may estimate a phase based on the first reference signal and the second reference signal. For instance, the second wireless device 205-*b* may estimate the phase as described with reference to one or more of FIGS. 2-6. In some approaches, the second wireless device 205-*b* may estimate the phase (e.g., phase difference or phase jump) by determining a first phase estimate of the first reference signal, determining a second phase estimate of the second reference signal, and determining a difference between the first phase estimate and the second phase estimate. In some approaches, the second wireless device 205-*b* may estimate a phase or perform joint channel estimation across a phase jump boundary for DFT-s-OFDM.

At 735, the second wireless device 205-*b* may decode second shared channel (e.g., PxSCH) data based on the estimated phase. For instance, the first wireless device 205-*a* may decode first shared channel data based on a DMRS as described with reference to FIG. 2.

Figure 8:
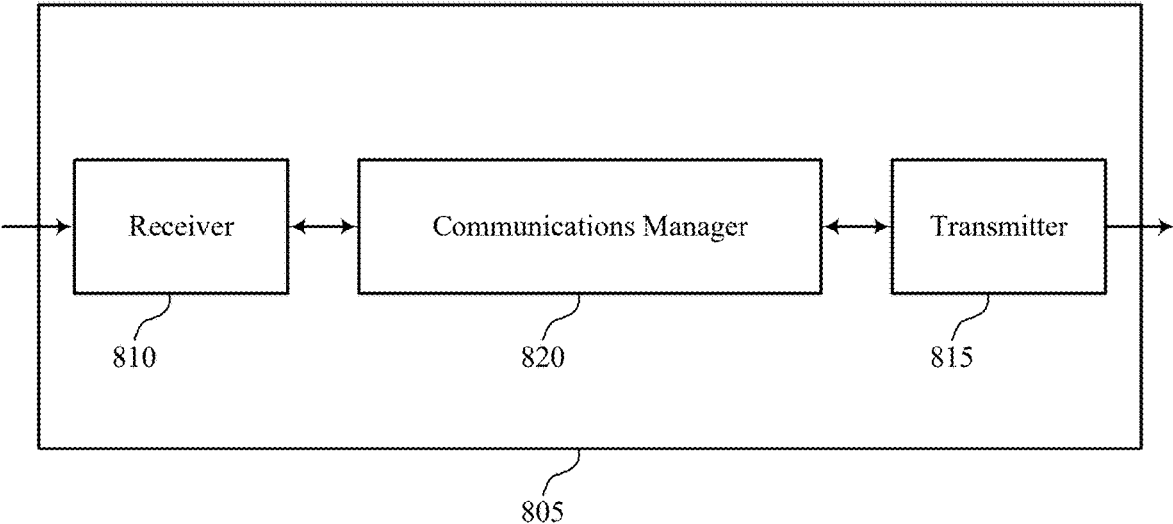
FIGS. 8 and 9 show block diagrams of devices that support reference signals for phase jump boundaries in accordance with one or more aspects of the present disclosure.

FIG. 8 shows a block diagram 800 of a device 805 that supports reference signals for phase jump boundaries in accordance with one or more aspects of the present disclosure. The device 805 may be an example of aspects of a wireless device (e.g., UE 115 or network entity 105) as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to reference signals for phase jump boundaries). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reference signals for phase jump boundaries). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations or components thereof may be examples of means for performing various aspects of reference signals for phase jump boundaries as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), an filed-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 is capable of, configured to, or operable to support a means for communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. The communications manager 820 is capable of, configured to, or operable to support a means for communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, or more efficient utilization of communication resources.

Figure 9:
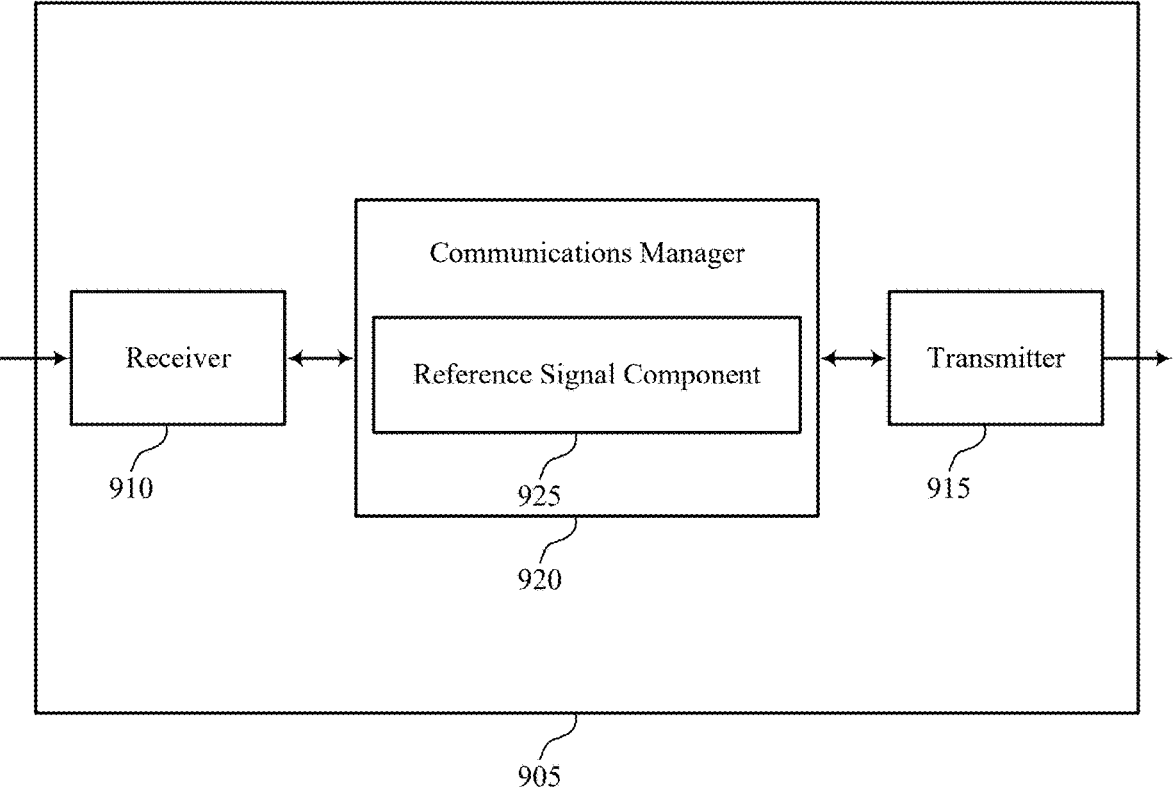

FIG. 9 shows a block diagram 900 of a device 905 that supports reference signals for phase jump boundaries in accordance with one or more aspects of the present disclosure. The device 905 may be an example of aspects of a device 805 or a wireless device (e.g., UE 115 or network entity 105) as described herein. The device 905 may include a receiver 910, a transmitter 915, and a communications manager 920. The device 905, or one of more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signals for phase jump boundaries). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signals for phase jump boundaries). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reference signals for phase jump boundaries as described herein. For example, the communications manager 920 may include a reference signal component 925, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The reference signal component 925 is capable of, configured to, or operable to support a means for communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. The reference signal component 925 is capable of, configured to, or operable to support a means for communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

Figure 10:
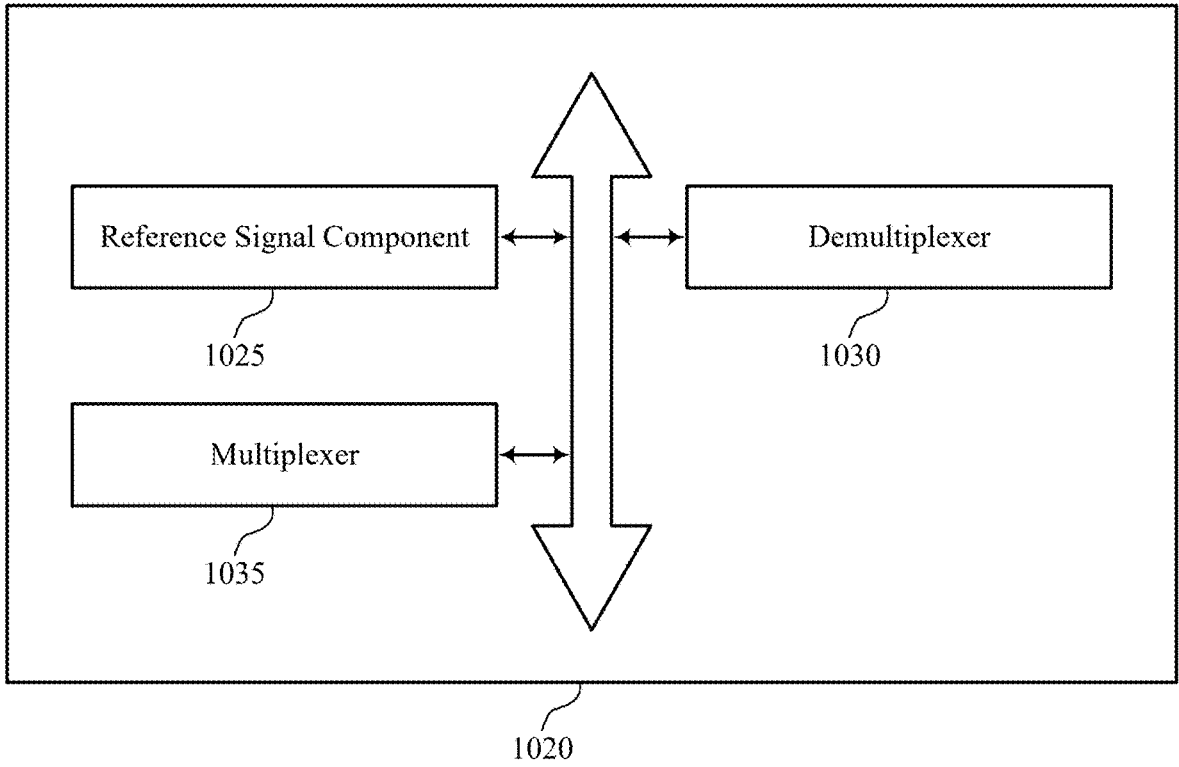
FIG. 10 shows a block diagram of a communications manager that supports reference signals for phase jump boundaries in accordance with one or more aspects of the present disclosure.
Figure 10:
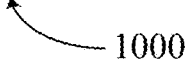

FIG. 10 shows a block diagram 1000 of a communications manager 1020 that supports reference signals for phase jump boundaries in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reference signals for phase jump boundaries as described herein. For example, the communications manager 1020 may include a reference signal component 1025 a demultiplexer 1030, a multiplexer 1035, or any combination thereof. Each of these components, or components or subcomponents thereof (e.g., one or more processors, one or more memories), may communicate, directly or indirectly, with one another (e.g., via one or more buses).

The reference signal component 1025 is capable of, configured to, or operable to support a means for communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. In some examples, the reference signal component 1025 is capable of, configured to, or operable to support a means for communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

The multiplexer 1035 is capable of, configured to, or operable to support a means for multiplexing the first reference signal with first shared channel data in the time domain before the multiplexed first reference signal and first shared channel data are converted from the time domain to a frequency domain by a first DFT. The multiplexer 1035 is capable of, configured to, or operable to support a means for multiplexing the second reference signal with second shared channel data in the time domain before the multiplexed second reference signal and second shared channel data are converted from the time domain to the frequency domain by a second DFT.

In some examples, the first shared channel data is communicated before the phase jump boundary via first DFT-s-OFDM symbols and the second shared channel data is communicated after the phase jump boundary via second DFT-s-OFDM symbols.

In some examples, the first reference signal includes a first random sequence and the second reference signal includes a second random sequence.

In some examples, the second symbol is before or after a symbol that carries a DMRS after the phase jump boundary.

In some examples, the first symbol includes a set of multiple first reference signals. In some examples, each of the set of multiple first reference signals is included in a respective one of a set of multiple first sets of one or more bits (or resource elements).

In some examples, a quantity of the set of multiple first reference signals or a quantity of the one or more bits (or resource elements) in each of the set of multiple first sets is based on a quantity of resource blocks allocated for the first shared channel data.

In some examples, the first reference signal is positioned at an end of the first symbol in the time domain and the second reference signal is positioned at a beginning of the second symbol in the time domain.

In some examples, the first symbol includes a set of multiple first reference signals with a first gap between at least two of the set of multiple first reference signals in the time domain, and the second symbol includes a set of multiple second reference signals with a second gap between at least two of the set of multiple second reference signals in the time domain.

In some examples, the first reference signal is evenly distributed across a frequency domain resource allocation associated with the first symbol.

In some examples, a first orthogonal cover code (OCC) associated with a first device and a second OCC associated with a second device are each applied for at least a portion of the first symbol (e.g., at least one resource element of the first set of one or more bits (or resource elements)).

In some examples, the first symbol includes a set of multiple sets of one or more bits (or resource elements). In some examples, each of a set of multiple offsets corresponds to a different offset applied to a respective set of the set of multiple sets of one or more bits (or resource elements). In some examples, each of the set of multiple offsets is associated with a different device.

In some examples, each of a set of multiple OCCs is respectively associated with each different device. In some examples, one or more of the set of multiple OCCs are each applied to one or more of the set of multiple sets of one or more bits (or resource elements).

In some examples, at least a portion of the first shared channel data is rate-matched to the first reference signal in the time domain and at least a portion of the second shared channel data is rate-matched to the second reference signal in the time domain.

In some examples, a TBS of the first shared channel data is based on the first reference signal being included in the first symbol.

In some examples, at least a portion of the first shared channel data is punctured in the time domain based on the first reference signal being included in the first symbol. In some examples, at least a portion of the second shared channel data is punctured in the time domain based on the second reference signal being included in the second symbol.

In some examples, the first shared channel data is first PUSCH data, the second shared channel data is second PUSCH data, and the wireless device is a UE.

In some examples, the demultiplexer 1030 is capable of, configured to, or operable to support a means for demultiplexing the first reference signal from the first shared channel data, where the first shared channel data is first PDSCH data, the demultiplexer 1030 is capable of, configured to, or operable to support a means for demultiplexing the second reference signal from the second shared channel data, where the second shared channel data is second PDSCH data, and the wireless device is a UE.

In some examples, the first shared channel data is first PDSCH data, the second shared channel data is second PDSCH data, and the wireless device is a network entity.

In some examples, the demultiplexer 1030 is capable of, configured to, or operable to support a means for demultiplexing the first reference signal from the first shared channel data, where the first shared channel data is first PUSCH data, the demultiplexer 1030 is capable of, configured to, or operable to support a means for demultiplexing the second reference signal from the second shared channel data, where the second shared channel data is second PUSCH data, and the wireless device is a network entity.

Figure 11:
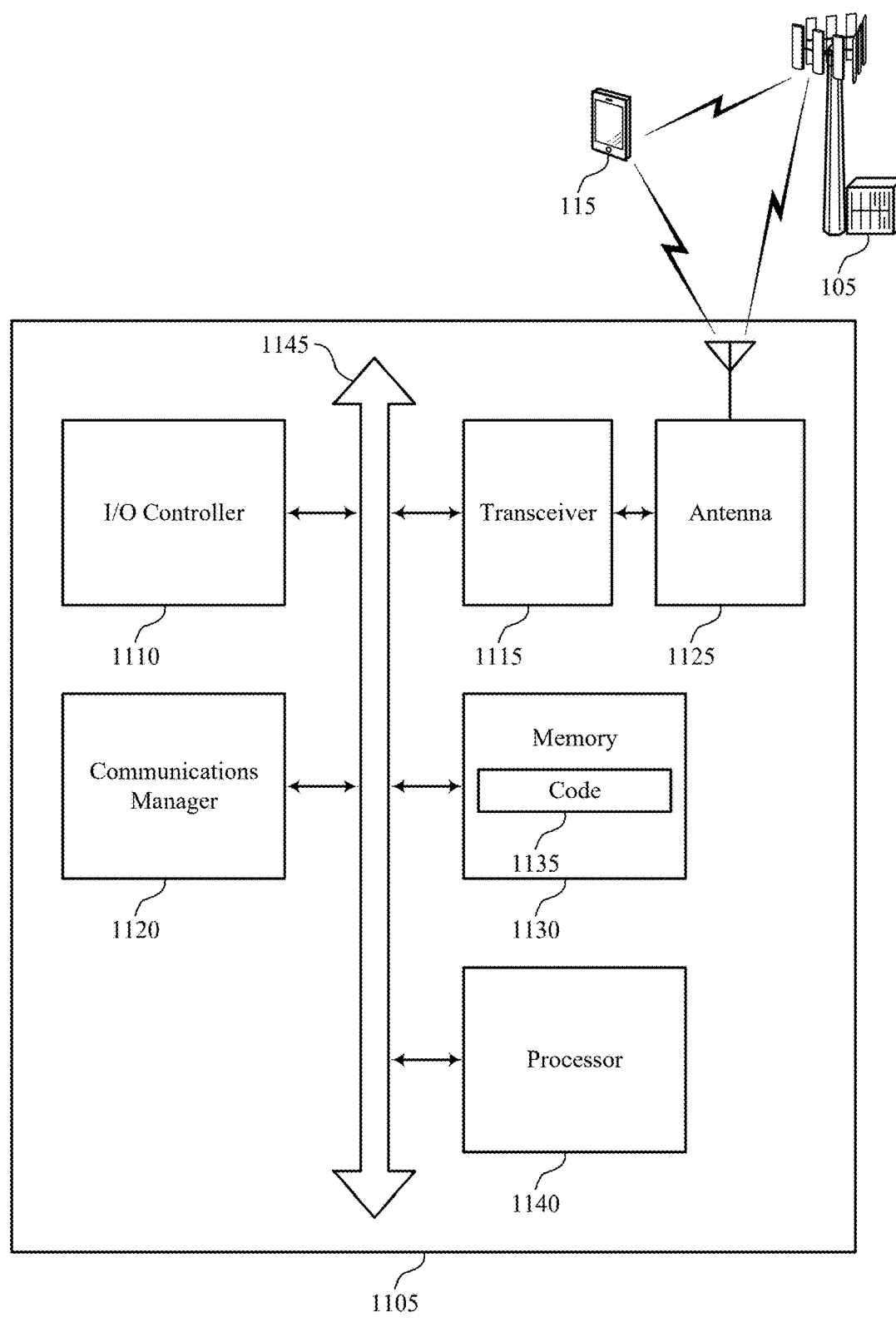
FIG. 11 shows a diagram of a system including a device that supports reference signals for phase jump boundaries in accordance with one or more aspects of the present disclosure.

FIG. 11 shows a diagram of a system 1100 including a device 1105 that supports reference signals for phase jump boundaries in accordance with one or more aspects of the present disclosure. The device 1105 may be an example of or include components of a device 805, a device 905, or a wireless device (e.g., UE 115 or network entity 105) as described herein. The device 1105 may include components for bi-directional voice and data communications including components for transmitting and receiving communications, such as a communications manager 1120, an I/O controller, such as an I/O controller 1110, a transceiver 1115, one or more antennas 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna. However, in some other cases, the device 1105 may have more than one antenna, which may be capable of concurrently transmitting or receiving multiple wireless transmissions. The transceiver 1115 may communicate bi-directionally via the one or more antennas 1125 using wired or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random-access memory (RAM) and read-only memory (ROM). The at least one memory 1130 may store computer-readable, computer-executable, or processor-executable code, such as the code 1135. The code 1135 may include instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may include, among other things, a BIOS which may control basic hardware or software operation such as the interaction with peripheral components or devices.

The at least one processor 1140 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting reference signals for phase jump boundaries). For example, the device 1105 or a component of the device 1105 may include at least one processor 1140 and at least one memory 1130 coupled with or to the at least one processor 1140, the at least one processor 1140 and the at least one memory 1130 configured to perform various functions described herein.

In some examples, the at least one processor 1140 may include multiple processors and the at least one memory 1130 may include multiple memories. One or more of the multiple processors may be coupled with one or more of the multiple memories, which may, individually or collectively, be configured to perform various functions described herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code 1135 (e.g., processor-executable code) stored in the at least one memory 1130 or otherwise, to perform one or more of the functions described herein.

For example, the communications manager 1120 is capable of, configured to, or operable to support a means for communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. The communications manager 1120 is capable of, configured to, or operable to support a means for communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT.

By including or configuring the communications manager 1120 in accordance with examples as described herein, the device 1105 may support techniques for improved communication reliability, reduced latency, reduced power consumption, more efficient utilization of communication resources, improved coordination between devices, longer battery life, or improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of reference signals for phase jump boundaries as described herein, or the at least one processor 1140 and the at least one memory 1130 may be otherwise configured to, individually or collectively, perform or support such operations.

FIG. 12 shows a flowchart illustrating a method 1200 that supports reference signals for phase jump boundaries in accordance with one or more aspects of the present disclosure. The operations of the method 1200 may be implemented by a wireless device or its components as described herein. For example, the operations of the method 1200 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1205, the method may include communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. The operations of 1205 may be performed in accordance with examples as disclosed herein. In some examples, aspects of the operations of 1205 may be performed by a reference signal component 1025 as described with reference to FIG. 10. Additionally or alternatively, means for performing 1205 may, but not necessarily, include, for example, antenna 1125, transceiver 1115, communications manager 1120, memory 1130 (including code 1135), processor 1140 or bus 1145.

At 1210, the method may include communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT. The operations of 1210 may be performed in accordance with examples as disclosed herein. In some examples, aspects of the operations of 1210 may be performed by a reference signal component 1025 as described with reference to FIG. 10. Additionally or alternatively, means for performing 1210 may, but not necessarily, include, for example, antenna 1125, transceiver 1115, communications manager 1120, memory 1130 (including code 1135), processor 1140 or bus 1145.

FIG. 13 shows a flowchart illustrating a method 1300 that supports reference signals for phase jump boundaries in accordance with one or more aspects of the present disclosure. The operations of the method 1300 may be implemented by a wireless device or its components as described herein. For example, the operations of the method 1300 may be performed by a wireless device as described with reference to FIGS. 1 through 11. In some examples, a wireless device may execute a set of instructions to control the functional elements of the wireless device to perform the described functions. Additionally, or alternatively, the wireless device may perform aspects of the described functions using special-purpose hardware.

At 1305, the method may include communicating a first symbol that is before a phase jump boundary in a time domain, the first symbol including a first reference signal, where the first reference signal is multiplexed with first shared channel data in the time domain before the multiplexed first reference signal and first shared channel data are converted from the time domain to a frequency domain by a first DFT. The operations of 1305 may be performed in accordance with examples as disclosed herein. In some examples, aspects of the operations of 1305 may be performed by a reference signal component 1025 as described with reference to FIG. 10. Additionally or alternatively, means for performing 1305 may, but not necessarily, include, for example, antenna 1125, transceiver 1115, communications manager 1120, memory 1130 (including code 1135), processor 1140 or bus 1145.

At 1310, the method may include communicating a second symbol that is after the phase jump boundary in the time domain, the second symbol including a second reference signal, where the second reference signal is multiplexed with second shared channel data in the time domain before the multiplexed second reference signal and second shared channel data are converted from the time domain to the frequency domain by a second DFT. The operations of 1310 may be performed in accordance with examples as disclosed herein. In some examples, aspects of the operations of 1310 may be performed by a reference signal component 1025 as described with reference to FIG. 10. Additionally or alternatively, means for performing 1310 may, but not necessarily, include, for example, antenna 1125, transceiver 1115, communications manager 1120, memory 1130 (including code 1135), processor 1140 or bus 1145.

At 1315, the method may include demultiplexing the first reference signal from the first shared channel data, where the first shared channel data is first PUSCH data. The operations of 1315 may be performed in accordance with examples as disclosed herein. In some examples, aspects of the operations of 1315 may be performed by a demultiplexer 1030 as described with reference to FIG. 10. Additionally or alternatively, means for performing 1315 may, but not necessarily, include, for example, antenna 1125, transceiver 1115, communications manager 1120, memory 1130 (including code 1135), processor 1140 or bus 1145.

At 1320, the method may include demultiplexing the second reference signal from the second shared channel data, where the second shared channel data is second PUSCH data, and where the wireless device is a network entity. The operations of 1320 may be performed in accordance with examples as disclosed herein. In some examples, aspects of the operations of 1320 may be performed by a demultiplexer 1030 as described with reference to FIG. 10. Additionally or alternatively, means for performing 1320 may, but not necessarily, include, for example, antenna 1125, transceiver 1115, communications manager 1120, memory 1130 (including code 1135), processor 1140 or bus 1145.

The following provides an overview of aspects of the present disclosure:

Aspect 1: A method for wireless communications by a wireless device, comprising: communicating a first symbol that is before a phase jump boundary in a time domain, the first symbol comprising a first reference signal, wherein the first reference signal is multiplexed with first shared channel data in the time domain before the multiplexed first reference signal and first shared channel data are converted from the time domain to a frequency domain by a first DFT; and communicating a second symbol that is after the phase jump boundary in the time domain, the second symbol comprising a second reference signal, wherein the second reference signal is multiplexed with second shared channel data in the time domain before the multiplexed second reference signal and second shared channel data are converted from the time domain to the frequency domain by a second DFT.

Aspect 2: The method of aspect 1, wherein the first shared channel data is communicated before the phase jump boundary via first DFT-s-OFDM symbols and the second shared channel data is communicated after the phase jump boundary via second DFT-s-OFDM symbols.

Aspect 3: The method of any of aspects 1 through 2, wherein the first reference signal comprises a first random sequence and the second reference signal comprises a second random sequence.

Aspect 4: The method of any of aspects 1 through 3, wherein the second symbol is before or after a symbol that carries a DMRS after the phase jump boundary.

Aspect 5: The method of any of aspects 1 through 4, wherein the first symbol comprises a plurality of first reference signals, each of the plurality of first reference signals is indicated via a respective one of a plurality of first sets of one or more bits.

Aspect 6: The method of aspect 5, wherein a quantity of the plurality of first reference signals or a quantity of the one or more bits in each of the plurality of first sets is based at least in part on a quantity of resource blocks allocated for the first shared channel data.

Aspect 7: The method of any of aspects 1 through 6, wherein the first reference signal is positioned at an end of the first symbol in the time domain and the second reference signal is positioned at a beginning of the second symbol in the time domain.

Aspect 8: The method of any of aspects 1 through 6, wherein the first symbol comprises a plurality of first reference signals with a first gap between at least two of the plurality of first reference signals in the time domain, and the second symbol comprises a plurality of second reference signals with a second gap between at least two of the plurality of second reference signals in the time domain.

Aspect 9: The method of any of aspects 1 through 6, wherein the first reference signal is evenly distributed across a frequency domain resource allocation associated with the first symbol.

Aspect 10: The method of any of aspects 1 through 9, wherein a first OCC associated with a first device and a second OCC associated with a second device are each applied for at least a portion of the first symbol.

Aspect 11: The method of any of aspects 1 through 10, wherein the first symbol comprises a plurality of sets of one or more bits, and each of a plurality of offsets corresponds to a different offset applied to a respective set of the plurality of sets of one or more bits.

Aspect 12: The method of aspect 11, wherein each of the plurality of offsets is associated with a different device, each of a plurality of orthogonal cover codes (OCCs) is respectively associated with each different device, and one or more of the plurality of OCCs are each applied to one or more of the plurality of sets of one or more bits.

Aspect 13: The method of any of aspects 1 through 12, wherein at least a portion of the first shared channel data is rate-matched to the first reference signal in the time domain and at least a portion of the second shared channel data is rate-matched to the second reference signal in the time domain.

Aspect 14: The method of aspect 13, wherein a TBS of the first shared channel data is based at least in part on the first reference signal being included in the first symbol.

Aspect 15: The method of any of aspects 1 through 14, wherein at least a portion of the first shared channel data is punctured in the time domain based at least in part on the first reference signal being included in the first symbol, and at least a portion of the second shared channel data is punctured in the time domain based at least in part on the second reference signal being included in the second symbol.

Aspect 16: The method of any of aspects 1 through 15, wherein the first shared channel data is first PUSCH data and the second shared channel data is second PUSCH data, and the wireless device is a UE.

Aspect 17: The method of any of aspects 1 through 15, further comprising: demultiplexing the first reference signal from the first shared channel data, wherein the first shared channel data is first PDSCH data; and demultiplexing the second reference signal from the second shared channel data, wherein the second shared channel data is second PDSCH data, and wherein the wireless device is a UE.

Aspect 18: The method of any of aspects 1 through 15, wherein the first shared channel data is first PDSCH data and the second shared channel data is second PDSCH data, and the wireless device is a network entity.

Aspect 19: The method of any of aspects 1 through 15, further comprising: demultiplexing the first reference signal from the first shared channel data, wherein the first shared channel data is first PUSCH data; and demultiplexing the second reference signal from the second shared channel data, wherein the second shared channel data is second PUSCH data, and wherein the wireless device is a network entity.

Aspect 20: A wireless device comprising one or more memories storing processor-executable code, a transceiver, and one or more processors coupled with the one or more memories and the transceiver, the one or more processors individually or collectively operable to execute the code to cause the wireless device to perform a method of any of aspects 1 through 19.

Aspect 21: A wireless device comprising at least one means for performing a method of any of aspects 1 through 19.

Aspect 22: A non-transitory computer-readable medium storing code the code comprising instructions executable by one or more processors to perform a method of any of aspects 1 through 19.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
one or more memories storing processor-executable code;
a transceiver; and
one or more processors coupled with the one or more memories and the transceiver, the one or more processors individually or collectively operable to execute the code to cause the wireless device to:
communicate, via the transceiver, a first symbol that is before a phase jump boundary in a time domain, the first symbol comprising a first reference signal, wherein the first reference signal is multiplexed with first shared channel data in the time domain before the multiplexed first reference signal and first shared channel data are converted from the time domain to a frequency domain by a first discrete Fourier transform (DFT); and
communicate, via the transceiver, a second symbol that is after the phase jump boundary in the time domain, the second symbol comprising a second reference signal, wherein the second reference signal is multiplexed with second shared channel data in the time domain before the multiplexed second reference signal and second shared channel data are converted from the time domain to the frequency domain by a second DFT.

2. The wireless device of claim 1, wherein the first shared channel data is communicated before the phase jump boundary via first discrete Fourier transform-spread-orthogonal frequency division multiplexing (DFT-s-OFDM) symbols and the second shared channel data is communicated after the phase jump boundary via second DFT-s-OFDM symbols.

3. The wireless device of claim 1, wherein the first reference signal comprises a first random sequence and the second reference signal comprises a second random sequence.

4. The wireless device of claim 1, wherein the second symbol is before or after a symbol that carries a demodulation reference signal (DMRS) after the phase jump boundary.

5. The wireless device of claim 1, wherein:
the first symbol comprises a plurality of first reference signals, and
each of the plurality of first reference signals is indicated via a respective one of a plurality of first sets of one or more bits.

6. The wireless device of claim 5, wherein a quantity of the plurality of first reference signals or a quantity of bits in each of the plurality of first sets is based at least in part on a quantity of resource blocks allocated for the first shared channel data.

7. The wireless device of claim 1, wherein the first reference signal is positioned at an end of the first symbol in the time domain and the second reference signal is positioned at a beginning of the second symbol in the time domain.

8. The wireless device of claim 1, wherein the first symbol comprises a plurality of first reference signals with a first gap between at least two of the plurality of first reference signals in the time domain, and the second symbol comprises a plurality of second reference signals with a second gap between at least two of the plurality of second reference signals in the time domain.

9. The wireless device of claim 1, wherein the first reference signal is evenly distributed across a frequency domain resource allocation associated with the first symbol.

10. The wireless device of claim 1, wherein a first orthogonal cover code (OCC) associated with a first device and a second OCC associated with a second device are each applied for at least a portion of the first symbol.

11. The wireless device of claim 1, wherein:

the first symbol comprises a plurality of sets of one or more bits, and each of a plurality of offsets corresponds to a different offset applied to a respective set of the plurality of sets of one or more bits.

12. The wireless device of claim 11, wherein:

each of the plurality of offsets is associated with a different device, each of a plurality of orthogonal cover codes (OCCs) is respectively associated with each different device, and one or more of the plurality of OCCs are each applied to one or more of the plurality of sets of one or more bits.

13. The wireless device of claim 1, wherein at least a portion of the first shared channel data is rate-matched to the first reference signal in the time domain and at least a portion of the second shared channel data is rate-matched to the second reference signal in the time domain.

14. The wireless device of claim 13, wherein a transport block size (TBS) of the first shared channel data is based at least in part on the first reference signal being included in the first symbol.

15. The wireless device of claim 1, wherein:

at least a portion of the first shared channel data is punctured in the time domain based at least in part on the first reference signal being included in the first symbol, and at least a portion of the second shared channel data is punctured in the time domain based at least in part on the second reference signal being included in the second symbol.

16. The wireless device of claim 1, wherein:

the first shared channel data is first physical uplink shared channel (PUSCH) data and the second shared channel data is second PUSCH data, and the wireless device is a user equipment (UE).

17. The wireless device of claim 1, wherein the one or more processors are individually or collectively further operable to execute the code to cause the wireless device to:

demultiplex the first reference signal from the first shared channel data, wherein the first shared channel data is first physical downlink shared channel (PDSCH) data; and demultiplex the second reference signal from the second shared channel data, wherein the second shared channel data is second PDSCH data, and wherein the wireless device is a user equipment (UE).

18. The wireless device of claim 1, wherein:

the first shared channel data is first physical downlink shared channel (PDSCH) data and the second shared channel data is second PDSCH data, and the wireless device is a network entity.

19. The wireless device of claim 1, wherein the one or more processors are individually or collectively further operable to execute the code to cause the wireless device to:

demultiplex the first reference signal from the first shared channel data, wherein the first shared channel data is first physical uplink shared channel (PUSCH) data; and demultiplex the second reference signal from the second shared channel data, wherein the second shared channel data is second PUSCH data, and wherein the wireless device is a network entity.

20. A method for wireless communications by a wireless device, comprising:

communicating a first symbol that is before a phase jump boundary in a time domain, the first symbol comprising a first reference signal, wherein the first reference signal is multiplexed with first shared channel data in the time domain before the multiplexed first reference signal and first shared channel data are converted from the time domain to a frequency domain by a first discrete Fourier transform (DFT); and communicating a second symbol that is after the phase jump boundary in the time domain, the second symbol comprising a second reference signal, wherein the second reference signal is multiplexed with second shared channel data in the time domain before the multiplexed second reference signal and second shared channel data are converted from the time domain to the frequency domain by a second DFT.

21. The method of claim 20, wherein the first shared channel data is communicated before the phase jump boundary via first discrete Fourier transform-spread-orthogonal frequency division multiplexing (DFT-s-OFDM) symbols and the second shared channel data is communicated after the phase jump boundary via second DFT-s-OFDM symbols.

22. The method of claim 20, wherein the first reference signal comprises a first random sequence and the second reference signal comprises a second random sequence.

23. The method of claim 20, wherein the second symbol is before or after a symbol that carries a demodulation reference signal (DMRS) after the phase jump boundary.

24. The method of claim 20, wherein:

the first symbol comprises a plurality of first reference signals, and each of the plurality of first reference signals is indicated via a respective one of a plurality of first sets of one or more bits.

25. The method of claim 24, wherein a quantity of the plurality of first reference signals or a quantity of bits in each of the plurality of first sets is based at least in part on a quantity of resource blocks allocated for the first shared channel data.

26. The method of claim 20, wherein the first reference signal is positioned at an end of the first symbol in the time domain and the second reference signal is positioned at a beginning of the second symbol in the time domain.

27. The method of claim 20, wherein the first symbol comprises a plurality of first reference signals with a first gap between at least two of the plurality of first reference signals in the time domain, and the second symbol comprises a plurality of second reference signals with a second gap between at least two of the plurality of second reference signals in the time domain.

28. The method of claim 20, wherein the first reference signal is evenly distributed across a frequency domain resource allocation associated with the first symbol.

29. A wireless device, comprising:

means for communicating a first symbol that is before a phase jump boundary in a time domain, the first symbol comprising a first reference signal, wherein the first reference signal is multiplexed with first shared channel data in the time domain before the multiplexed first reference signal and first shared channel data are converted from the time domain to a frequency domain by a first discrete Fourier transform (DFT); and means for communicating a second symbol that is after the phase jump boundary in the time domain, the second symbol comprising a second reference signal, wherein the second reference signal is multiplexed with second shared channel data in the time domain before the multiplexed second reference signal and second shared channel data are converted from the time domain to the frequency domain by a second DFT.

30. A non-transitory computer-readable medium storing code, the code comprising instructions executable by one or more processors to:

communicate a first symbol that is before a phase jump boundary in a time domain, the first symbol comprising a first reference signal, wherein the first reference signal is multiplexed with first shared channel data in the time domain before the multiplexed first reference signal and first shared channel data are converted from the time domain to a frequency domain by a first discrete Fourier transform (DFT); and communicate a second symbol that is after the phase jump boundary in the time domain, the second symbol comprising a second reference signal, wherein the second reference signal is multiplexed with second shared channel data in the time domain before the multiplexed second reference signal and second shared channel data are converted from the time domain to the frequency domain by a second DFT.

* * * * *